(12) United States Patent
Yang et al.

(10) Patent No.: US 10,489,046 B2
(45) Date of Patent: Nov. 26, 2019

(54) WATCH-TYPE MOBILE TERMINAL AND METHOD FOR CONTROLLING THE SAME

(71) Applicant: LG ELECTRONICS INC., Seoul (KR)

(72) Inventors: Yoonseok Yang, Seoul (KR); Kyunghye Seo, Seoul (KR); Juha Hyun, Seoul (KR); Shinnyue Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 889 days.

(21) Appl. No.: 14/990,692

(22) Filed: Jan. 7, 2016

(65) Prior Publication Data

US 2017/0031556 A1 Feb. 2, 2017

(30) Foreign Application Priority Data

Jul. 29, 2015 (KR) ........................ 10-2015-0107394

(51) Int. Cl.
*G06F 3/0488* (2013.01)
*G06F 1/16* (2006.01)
(Continued)

(52) U.S. Cl.
CPC ........... *G06F 3/0488* (2013.01); *G04G 21/04* (2013.01); *G06F 1/163* (2013.01); *G06F 3/0482* (2013.01);
(Continued)

(58) Field of Classification Search
CPC .. G04G 21/04; G06F 3/04817; H04M 1/7253; H04M 1/72583
See application file for complete search history.

(56) References Cited

U.S. PATENT DOCUMENTS

2002/0115478 A1* 8/2002 Fujisawa ............. H04M 1/6505
455/567
2010/0005076 A1* 1/2010 Roden ................. G06F 16/9537
707/E17.014
(Continued)

FOREIGN PATENT DOCUMENTS

CN 1389058 1/2003
WO 214143959 9/2014

OTHER PUBLICATIONS

European Patent Office Application Serial No. 16173386.0, Search Report dated Dec. 7, 2016, 11 pages.
(Continued)

*Primary Examiner* — Anil K Bhargava
(74) *Attorney, Agent, or Firm* — Lee Hong Degerman Kang & Waimey

(57) ABSTRACT

The present invention is related to a watch-type mobile terminal and a method for controlling the watch-type mobile terminal. In case a call is received, the present invention can respond to an incoming call in an automatic answering mode due to an agent through a watch-type mobile terminal worn by the user on his/her wrist. In case the user searches for a paired external electronic device and attempts call conversation, the automatic answering mode due to an agent can be terminated. Accordingly, in case the user is unable to promptly respond to a received call through the paired external electronic device, the received call can be efficiently controlled through the watch-type mobile terminal.

15 Claims, 33 Drawing Sheets

(51) Int. Cl.
  *G06F 3/0484* (2013.01)
  *H04M 1/725* (2006.01)
  *G06F 3/0481* (2013.01)
  *G06F 3/0482* (2013.01)
  *G06F 3/16* (2006.01)
  *H04B 1/3827* (2015.01)
  *G04G 21/04* (2013.01)
  *H04M 1/64* (2006.01)
  *H04M 1/67* (2006.01)
  *H04M 19/04* (2006.01)

(52) U.S. Cl.
  CPC ........ *G06F 3/0484* (2013.01); *G06F 3/04817* (2013.01); *G06F 3/167* (2013.01); *H04B 1/385* (2013.01); *H04M 1/642* (2013.01); *H04M 1/67* (2013.01); *H04M 1/7253* (2013.01); *H04M 1/72563* (2013.01); *H04M 19/04* (2013.01); *H04M 1/72547* (2013.01); *H04M 1/72583* (2013.01); *H04M 2250/74* (2013.01)

(56) References Cited

U.S. PATENT DOCUMENTS

2014/0187233 A1* 7/2014 Chen .................. H04M 1/0277
                                                       455/422.1
2014/0349692 A1* 11/2014 Zhou .................. G06Q 20/3829
                                                       455/466
2016/0004224 A1* 1/2016 Pi ........................ G04G 21/025
                                                       368/10

OTHER PUBLICATIONS

European Patent Office Application Serial No. 16173386.0, Search Report dated Feb. 21, 2017, 19 pages.

* cited by examiner

FIG. 6
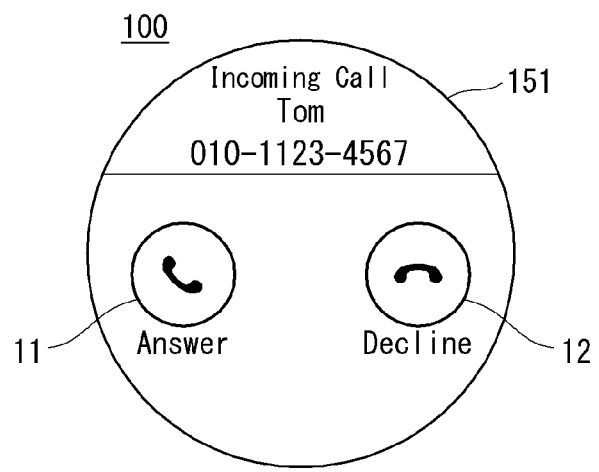

FIG. 10
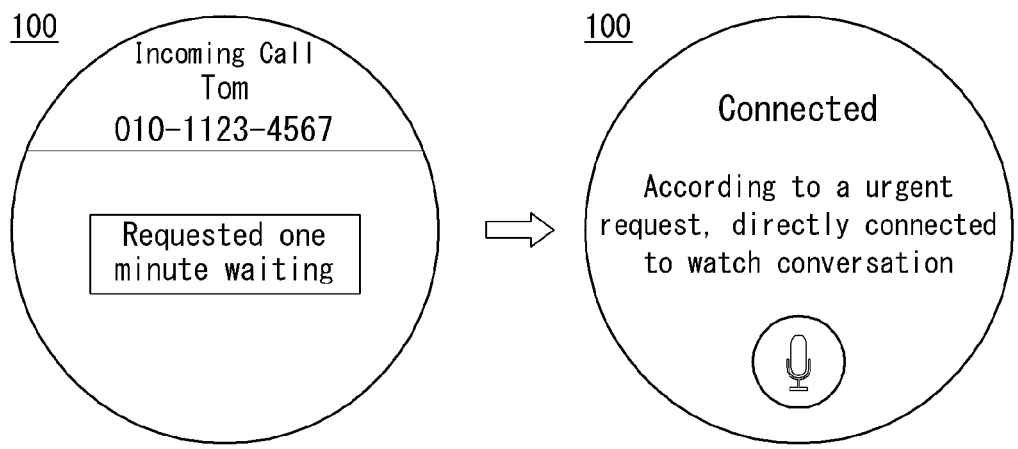
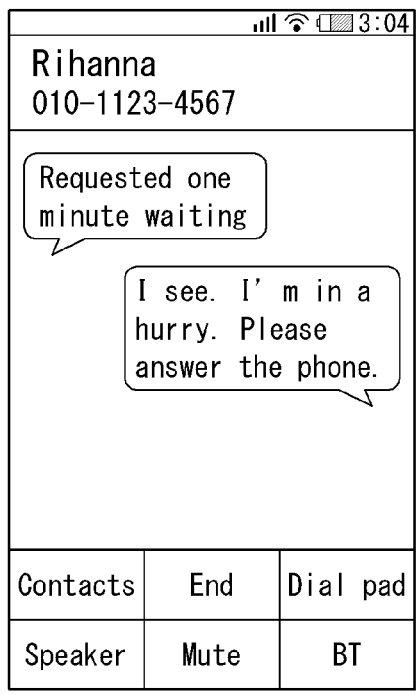

FIG. 12c
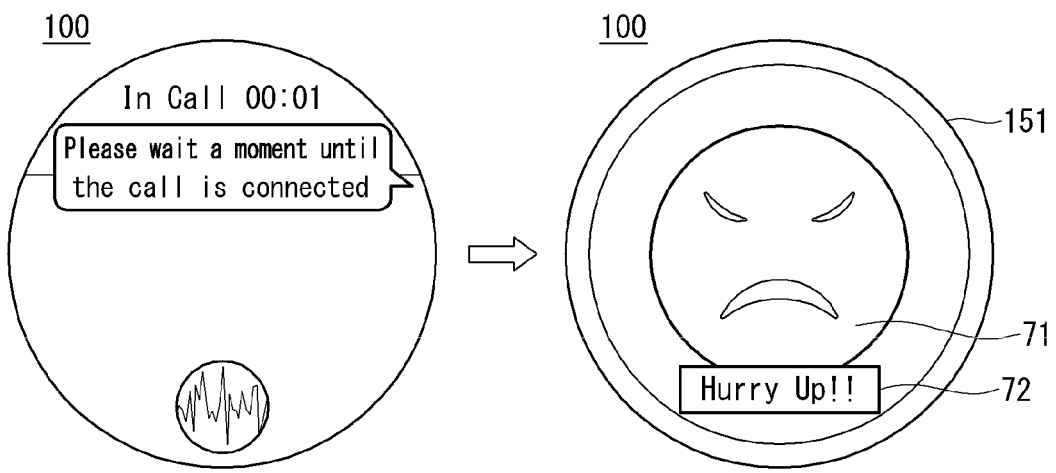
After a predetermined time period after automatic answering due to an agent
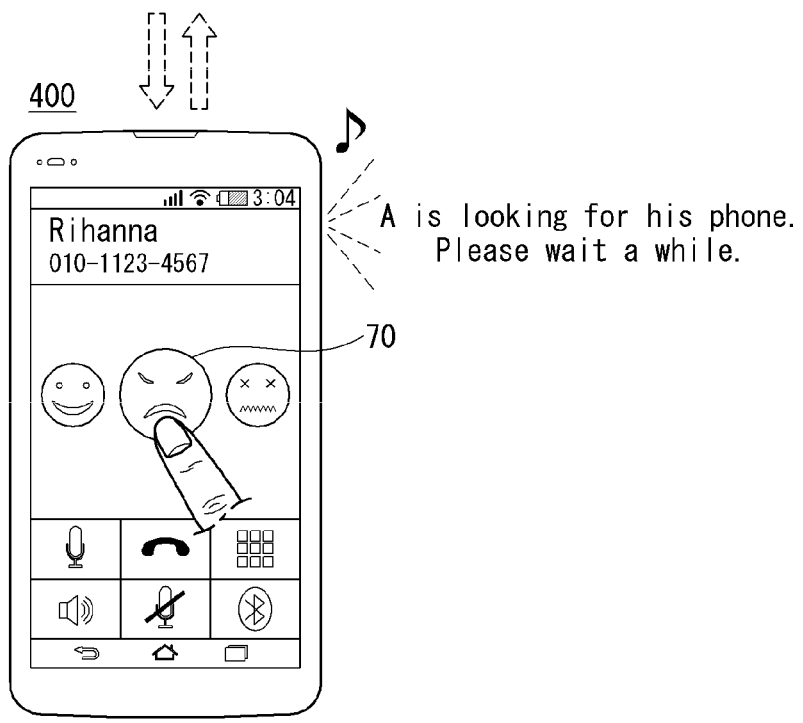

FIG. 13
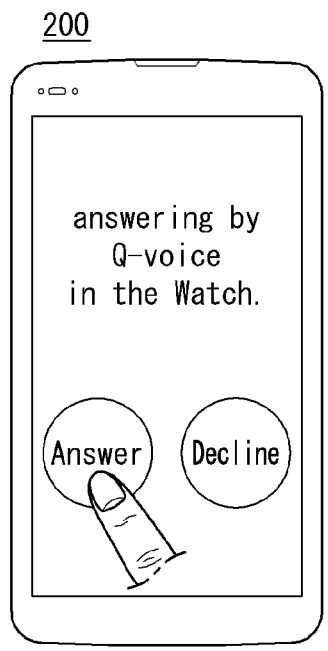
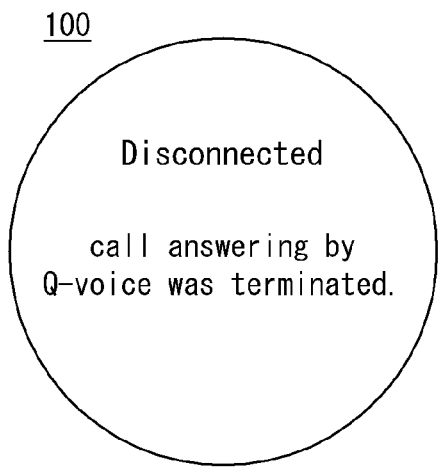

FIG. 21b
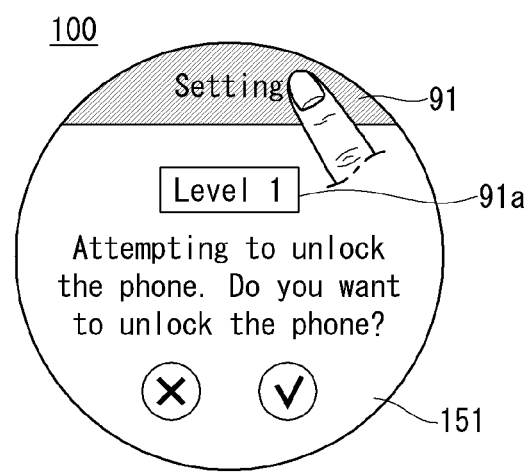
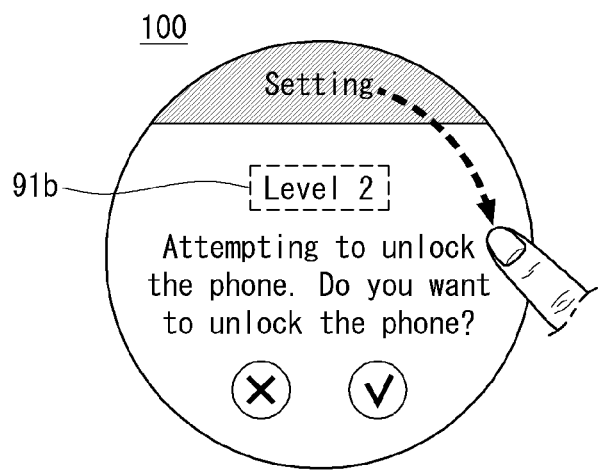

0. locks
1. Swipe → Locks
2. Passcode → set

WATCH-TYPE MOBILE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Patent Application No(s). 10-2015-0107394, filed on Jul. 29, 2015, the contents of which are all hereby incorporated by reference herein in their entirety.

BACKGROUND OF THE INVENTION

Field of the Invention

The present invention is related to a watch-type mobile terminal used being coupled to a mobile terminal of a user and yielding increased utility; and a method for controlling the watch-type mobile terminal.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Meanwhile, recently a lot of research efforts are being made to develop wearable computing devices, and interests about how wearable computing devices can be utilized are getting bigger. A wearable computing device may refer to all kinds of computing device which can be worn by a user such as clothes, watch, and eyeglasses. A user can conveniently operate a mobile terminal such as a smart phone or a tablet PC by using his/her finger or a stylus pen, but to do so, the user has to put up with inconvenience of carrying the mobile terminal in his/her pocket, bag, or hand. On the other hand, in the case of a wearable computing device, since the user can wear the wearable computing device like a watch or eyeglasses, portability can be much improved compared with conventional mobile terminals.

It should be noted that for most cases, a wearable computing device is used being coupled to a mobile terminal of the user and it has been used mainly to receive notification about various events generated from the mobile terminal.

In particular, suppose that the user happens to be in such a situation where the user is unable to use his/her mobile terminal while predetermined events are being generated from the user's mobile terminal. To deal with the situation, demand for controlling the events generated from the mobile terminal by using a wearable computing device is growing. Also, in case a mobile terminal is separated far apart from its coupling wearable computing device, security of the mobile terminal can be weakened when the mobile terminal is accessed by a third person. In this regard, it is necessary to more conveniently control the security of a mobile terminal through a wearable computing device.

Efforts are ongoing to support and increase the functionality of mobile terminals. Such efforts include software and hardware improvements, as well as changes and improvements in the structural components.

SUMMARY OF THE INVENTION

Accordingly, an object of the present invention is to address the above-noted and other problems.

An object of the present invention is to provide a watch-type mobile terminal providing a user interface through which a user can control the watch-type mobile terminal easily and efficiently; and a method for controlling the watch-type mobile terminal.

Also, an object of the present invention is to provide a watch-type mobile terminal providing a user interface through which a user can efficiently control an event generated from an external electronic device coupled to the watch-type mobile terminal and a method for controlling the watch-type mobile terminal.

Also, an object of the present invention is to provide a watch-type mobile terminal providing a user interface through which a user can more conveniently handle a call received by an external electronic device in a situation where the watch-type mobile terminal is displaced from the external electronic device by more than a predetermined distance or the user is unable to check an event generated from the external electronic device; and a method for controlling the watch-type mobile terminal.

Also, an object of the present invention is to provide a watch-type mobile terminal capable of increasing security of an external electronic device by controlling access to the external electronic device according to a distance between the watch-type mobile terminal and the external electronic device; and a method for controlling the watch-type mobile terminal.

A watch-type mobile terminal according to one aspect of the present invention comprises a body; a band structured to be worn on a wrist of a user; a display positioned on a front side of the body; a communication unit configured to communicate with a paired external electronic device; and a controller configured to caused the display to display a call waiting screen when an incoming call from a calling terminal is received at the external electronic device; control an agent to provide a response to the calling terminal for the received call in an automatic answering mode in response to an input is received via the call waiting screen, and terminate the automatic answering mode when the received call is connected to the calling terminal in response to an operation of the external electronic device.

The agent is an application operating in a voice recognition mode, and the controller is further configured to activate a microphone as the watch-type mobile terminal enters the automatic answering mode and include voice input received via the activated microphone in the response to the calling terminal.

The call waiting screen includes a first graphic object to permit connecting the received call and a second graphic object to permit declining the received call; wherein the controller may be further configured to cause the display to display a third graphic object corresponding to the automatic answering mode when a touch input is received at the first graphic object for more than a first threshold period of time, enter the automatic answering mode in response to a touch input selecting the first graphic object.

Wherein the controller is further configured to cause the display to display a fourth graphic object when the touch input is received at the first graphic for more than a second threshold period of time, wherein the third graphic object and the fourth graphic object are displayed simultaneously for a period of time, and connect the received call in a speaker mode, and activate the microphone, in response to a touch input select the fourth graphic object.

Wherein the controller is further configured to activate the microphone in response to a touch input selecting the third graphic object from a second threshold period of time.

The controller can cause the display to display a response from the calling terminal, wherein the response from the calling terminal comprises Speech-To-Text (STT) converted text.

The controller can set content of the response from the calling terminal as search keywords and provide a search result to the display.

Wherein the controller further configured to transmit to the external electronic device a signal which controls output power of an output unit located in the external electronic device to a maximum when the automatic answering mode is maintained for a first threshold period of time, wherein the output unit can include at least one of a speaker or a vibration unit.

Wherein the controller can receive location information of the external electronic device and cause the display to display the location information when the automatic answering mode is maintained for a first threshold period of time.

Wherein the controller cause predetermined content to be shared with the calling terminal according to the automatic answering mode in respect to a input received at the mobile terminal during the automatic answering mode.

The controller can control the predetermined content to be played at the calling terminal during the call.

Wherein the controller is further configured to cause to display to display the call waiting screen when distance between the mobile terminal and the external electronic device is less than a threshold distance, and cause the display to display a message list for declining the incoming when the distance between the mobile terminal and the external electronic device is greater than a threshold distance.

Wherein the controller can temporarily suspend connection to the call, cause the display to display a graphic object on the call waiting screen upon detection of connection to the received call being attempted by operation of the external electronic device, and control the external electronic device to resume connection to the call in response to selection of the graphic object.

The controller can receive an image captured through a camera of the external electronic device from the external electronic device and cause the display to display the received image on the call waiting screen.

A watch-type mobile terminal according to another aspect of the present invention comprises a body; a band structured to be worn on a wrist of a user; a display positioned on a front surface of the body; a communication configured to communicate with a paired external electronic device; and a controller configured to cause the display to display a user interface for controlling access to the external electronic device when a distance between the mobile terminal and the external electronic device exceeds a threshold distance.

Wherein the access to the external electronic device can include an operation for releasing a lock state of the external electronic device, and the user interface can include a menu for approving or rejecting release of the lock state.

Wherein the access to the external electronic device can include use of at least one available application or contents installed in the external electronic device, and the user interface can include a menu for approving or rejecting use of the at least one application or contents.

In case the controller detects a third external device accessing the external electronic device, the controller can provide the display with the user interface that includes a plurality of security levels when another external device is detected accessing the external electronic device, wherein the plurality of security levels permit setting of different levels of accessibility to the external electronic device.

A method for controlling a watch-type mobile terminal according to a yet another aspect of the present invention comprises detecting an external electronic device paired with the watch-type mobile terminal; displaying, on a display, a call waiting screen when an incoming call from a calling terminal is received at the external electronic device; controlling an agent to provide a response to the calling terminal for the received call in an automatic answering mode in response an input received via the call waiting screen; and terminating the automatic answering mode when the received call is connected to the calling terminal in response to an operation of the external in response to operation of the external electronic device.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 6 is an example of a call waiting screen provided to an external electronic device and a watch-type mobile terminal when a call is received by the external electronic device according to one embodiment of the present invention.

FIG. 7a is an example of a user interface for entering an automatic answering mode due to an agent in a call waiting screen, and FIG. 7b illustrates a state where an automatic answering mode due to an agent has been carried out.

FIG. 10 illustrates an example where an incoming call is forced to be connected to a watch-type mobile terminal in case a call response is related to an emergency in an automatic answering mode due to an agent.

FIGS. 12a to 12c illustrate operation of a watch-type mobile terminal in case an automatic answering mode due to an agent lasts for more than a predetermined time period.

FIG. 13 illustrates S130, S140 of FIG. 4.

FIGS. 21a and 21b illustrate an example of setting access levels to an external electronic device through a watch-type mobile terminal according to one embodiment of the present invention.

DETAILED DESCRIPTION OF THE INVENTION

Figure 1:
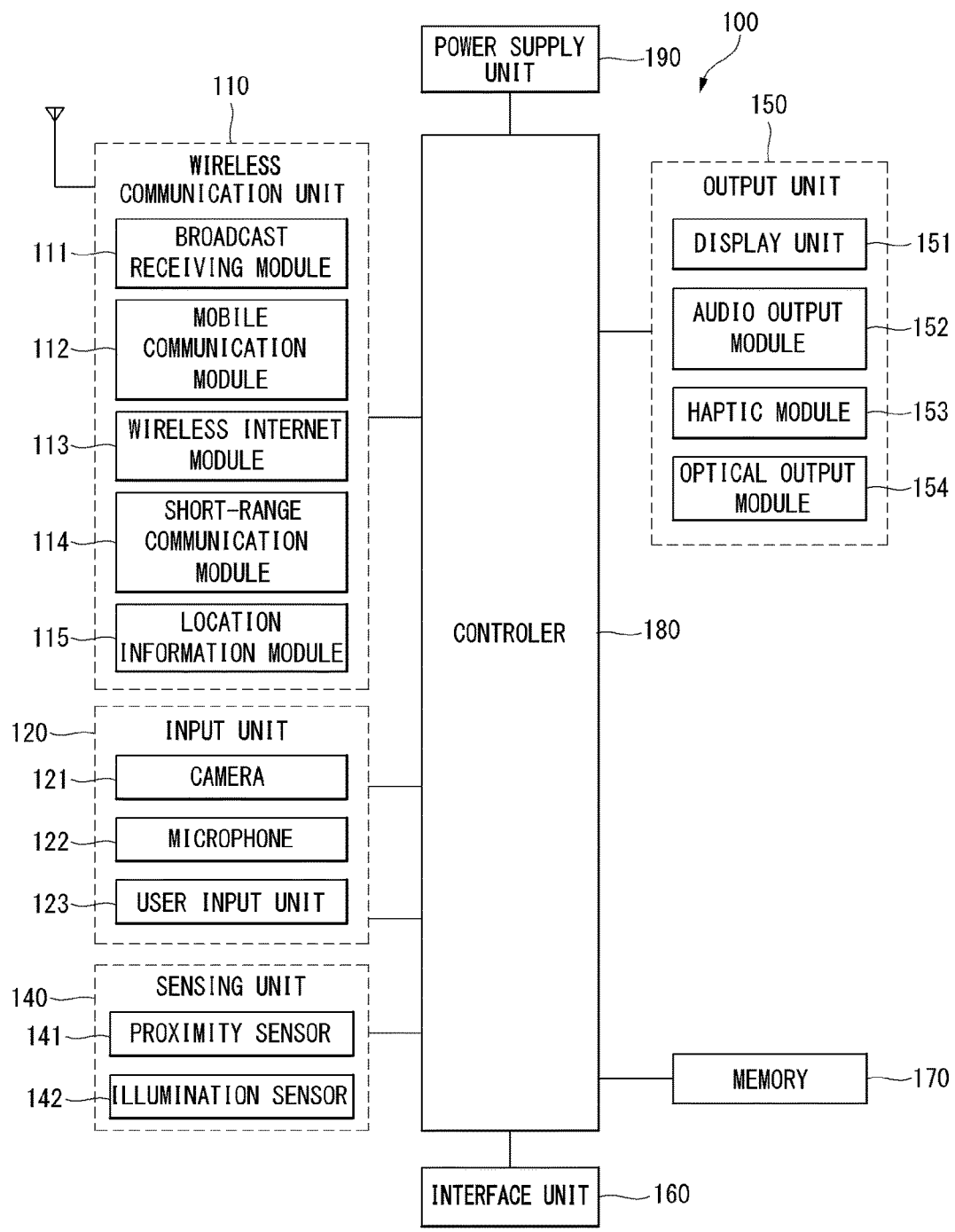
FIG. 1 is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

FIG. 1A is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
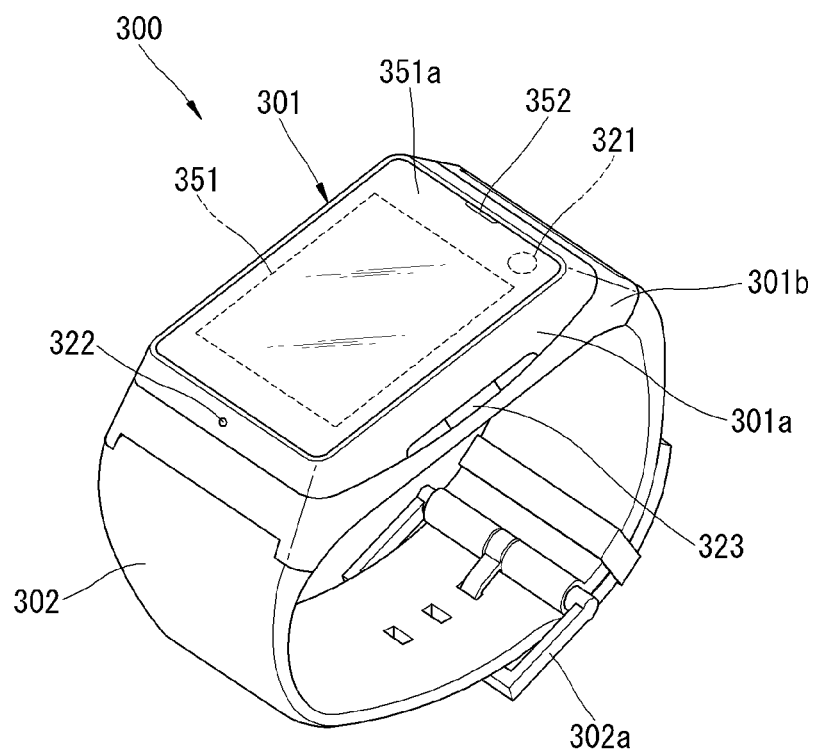
FIG. 2 is a conceptual view of a wearable mobile terminal according to another alternative embodiment of the present disclosure

FIG. 2 is a perspective view illustrating one example of a watch-type mobile terminal 300 in accordance with another exemplary embodiment. As illustrated in FIG. 2, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIG. 1.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

In what follows, embodiments of the present invention will be described. For the convenience of description, this document assumes that the display 151 is a touch screen 151. As described above, a touch screen 151 can carry out both of an information display function and an information input function. However, it should be noted that the present invention is not limited to the assumption. Also, the touch input described in this document can include both of a contact-type and a proximity touch input.

Figure 3:
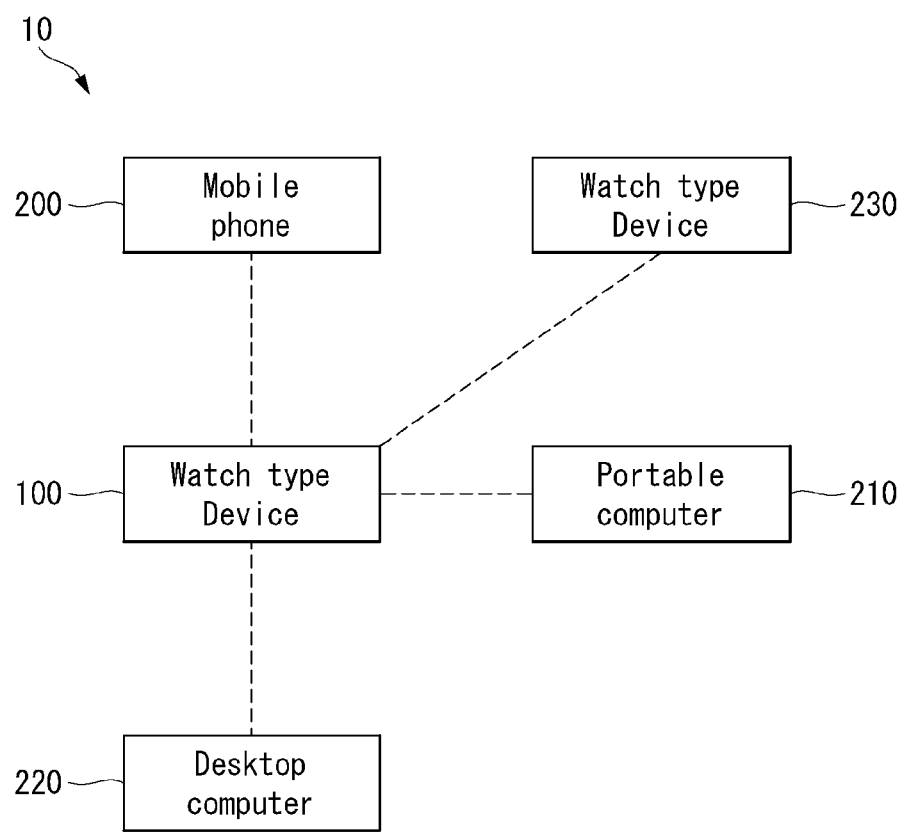
FIG. 3 illustrates an operating environment of a watch-type mobile terminal according to one embodiment of the present invention.

FIG. 3 illustrates an operating environment of a watch-type mobile terminal according to one embodiment of the present invention.

With reference to FIG. 3, in a personal radio environment 10 where the watch-type mobile terminal is operating, users of a plurality of electronic devices are allowed to use the watch-type mobile terminal 100 for displaying or receiving particular information.

The personal radio environment 10 can be activated so that users of the watch-type mobile terminal 100 can interact with a mobile phone 200, a portable computer 210, a desktop computer 220 and/or other watch-type mobile terminal 230. Interaction with the watch-type mobile terminal 100 can be carried out in a wired or wireless manner. For the convenience of the user, the watch-type mobile terminal 100 supports radio interaction with at least one electronic device among one or more external electronic devices 200, 210, 220, 230. At this time, the watch-type mobile terminal 100 can use a pico-net formed among neighboring external electronic devices.

In the following, described will be pairing between the watch-type mobile terminal 100 and an external mobile terminal 200 according to one embodiment of the present invention. For the convenience of description, the watch-type mobile terminal 100 is called a smart watch 100, and the external mobile terminal 200 is called a smart phone 200. The smart phone 200 can correspond to a digital device capable of connecting to the smart watch 100 for communication.

Pairing can refer to connection between the smart watch 100 and the smart phone 200 for data transmission and reception. The smart watch 100 and the smart phone 200 can carry out bilateral data transmission and reception by establishing a connection for communication. The pairing can be implemented by using Bluetooth or Near Field Communication (NFC). As one example, the pairing can be carried out through a user input at the smart watch 100 or the smart phone 200. The user input can be obtained through a separate button prepared for communication connection or through a user interface.

Once a communication connection is established, the smart watch 100 is able to carry out data communication with the smart phone 200 while a session is open. Meanwhile, the smart watch 100 can perform selective data communication with a plurality of external electronic devices 200, 210, 220, 230 by carrying out pairing with the plurality of external electronic devices.

Detecting a paired smart phone 200, the smart watch 100 can provide notification about an event generated from the smart phone 200. The event denotes a change of state generated from the smart phone 200, including reception of a call, text, SNS message, schedule notification, and weather notification. Meanwhile, notification of the event generated from the smart phone 200 is intended to inform the user of the aforementioned event, which can be displayed in the form of text, voice, or vibration.

In one embodiment of the present invention, a predetermined call can be received while the smart watch 100 is paired with the smart phone 200. At this time, the smart watch 100 can have the same phone number as the smart phone 200. If the smart phone 200 receives a call while the two devices are paired with each other, the received call is also delivered to the smart watch 100, and the smart watch 100 can notify the user of the call reception through bell sound or vibration.

Meanwhile, even if call identification numbers of the two devices differ from each other, the smart watch 100 can still be notified of a received call in case the smart phone 200 receives the call as long as the two devices are paired to each other.

In what follows, described will be various embodiments of the present invention where the smart watch 100 is worn by the user on the wrist for most cases, and in case a predetermined event is generated from the smart phone 200 but the user is unable to check the event directly from the smart phone 200, the generated event can still be controlled more conveniently through the smart watch 100.

Figure 4:
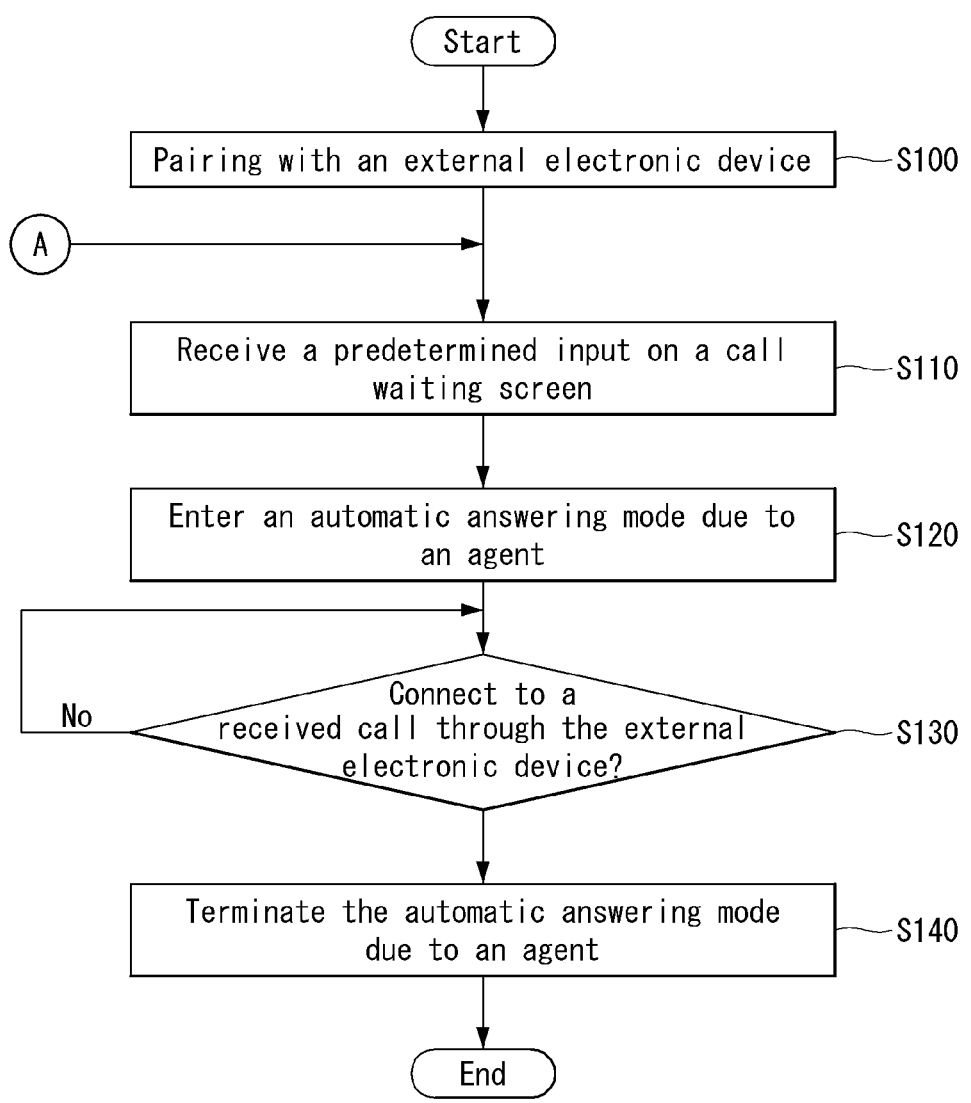
FIG. 4 is a flow diagram of a method for controlling a watch-type mobile terminal according to one embodiment.

FIG. 4 is a flow diagram of a method for controlling a watch-type mobile terminal according to one embodiment.

With reference to FIG. 4, a watch-type mobile terminal 100 carries out pairing with an external electronic device 200, S100.

As described with reference to FIG. 3, as the two devices are paired, an event generated from the external electronic device 200 can be shared with the watch-type mobile terminal. The event can include an incoming call.

In case the external electronic device 200 receives an incoming call, the controller 180 can provide a call waiting screen to the display 151. The call waiting screen can be provided not only to the watch-type mobile terminal 100 but also the display of the external electronic device 200.

The controller 180 can receive a predetermined input from the call waiting screen S110 and enter an automatic answering mode due to an agent in response to the predetermined input S120.

The predetermined input includes an input to the user interface for processing an incoming call received by the external electronic device 200. The user interface can include at least one graphic object to process the incoming call. The user interface including graphic objects will be described in more detail with reference to FIG. 6 and so on. As one example, the graphic object can include an icon for entering an automatic answering mode due to an agent.

The automatic answering mode due to an agent can employ an Intelligent Agent (IA) capable of carrying out conversation with a caller on behalf of the user by autonomously connecting to an incoming call; the user otherwise directly connects to the incoming call and carries out conversation with the caller. The IA, being installed as a separate module from the controller 180, may carry out an automatic response with respect to an incoming call; or it may be installed together with the controller 180 to carry out the automatic response.

Meanwhile, the automatic answering mode due to an agent can be carried out as an agent application is executed according to an incoming call. In response to the incoming call, the controller 180 can carry out the agent application automatically or according to the user's selection.

The automatic answering mode due to an agent can be carried out in a voice recognition mode. In the voice recognition mode, the controller 180 can receive a voice command of the user, deliver the user's voice command directly to the caller, or respond to the call by analyzing the user's voice command.

In one embodiment of the present invention, it is assumed that the user uses an external electronic device 200 and a watch-type mobile terminal 100 paired with the external electronic device 200. In case the external electronic device receives an incoming call while the external electronic device 200 is not found in the vicinity of the user as the external electronic device 200 is separated far apart or stored in a bag, the watch-type mobile terminal 100 can be used to temporarily delay the call by carrying out an automatic answering mode due to an agent until the user finds the external electronic device 200. Meanwhile, The user's voice command can still be delivered to the caller in real-time through the agent even in the automatic answering mode due to an agent; therefore, it should be noted that execution of the automatic answering mode due to an agent as described above does not mean that the user is completely excluded.

In case the controller 180 detects connection to the incoming call received by the external electronic device 200 while responding to the received call through the automatic answering mode due to an agent S130, the controller 180 can terminate the automatic answering mode due to an agent carried out in the watch-type mobile terminal 100, S140.

While the watch-type mobile terminal 100 is responding to the call through the automatic answering mode due to an agent, the external electronic device 200 can still display a call waiting screen or display that the watch-type mobile terminal 100 is responding to the call through the automatic answering mode. In case the user finds the external electronic device 200 and pick up the external electronic device 200 or the user pushes a call button on a call waiting screen of the external electronic device 200, the incoming call is connected directly to the external electronic device 200; thus, the automatic answering mode due to an agent in the watch-type mobile terminal 100 can be automatically terminated.

Figure 5:
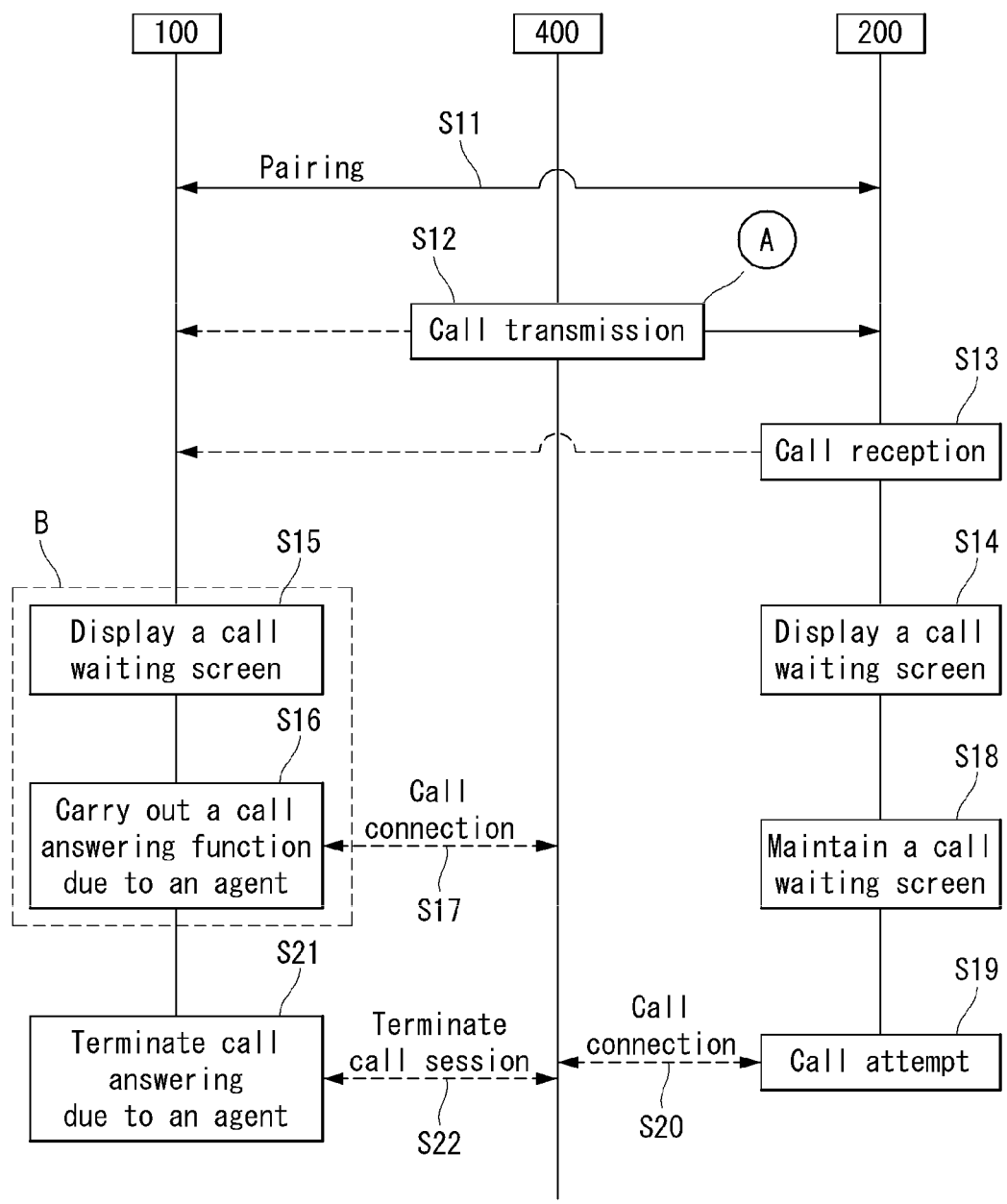
FIG. 5 is a flow diagram of a method for controlling a watch-type mobile terminal according to a first embodiment of the present invention.

FIG. 5 is a flow diagram of a method for controlling a watch-type mobile terminal according to a first embodiment of the present invention. FIGS. 8 to 15 illustrate examples of implementing a method for controlling a watch-type mobile terminal according to a first embodiment of the present invention.

A method for controlling a watch-type mobile terminal according to a first embodiment of the present invention can be implemented in the watch-type mobile terminal 100 described with reference to FIGS. 1 to 3. In what follows, described in detail with reference to related drawings will be a method for controlling a watch-type mobile terminal according to a first embodiment of the present invention and operation of the watch-type mobile terminal 100 to implement the method.

FIG. 5 is a flow diagram illustrating a first embodiment of the present invention viewed in terms of signal flow among a calling terminal 400, an external electronic device receiving a call 200, and a watch-type mobile terminal 100 coupled to the external electronic device 200.

With reference to FIG. 5, the watch-type mobile terminal 100 can carry out pairing with the external electronic device 200, S11. The watch-type mobile terminal 100 can detect the paired external electronic device 200.

The calling terminal 400 can request a call to the external electronic device 200, S12. The call requested by the calling terminal 400 is delivered to the external electronic device 200, S13, and the external electronic device 200 can display a call waiting screen on the display as the call is received S14. At the same time, the received call can be delivered to the watch-type mobile terminal 100 paired with the external electronic device 200.

Call transmission (A) by the calling terminal 400 can be delivered directly to the watch-type mobile terminal 100 irrespective of the external electronic device 200; the present invention is not limited to the above example of delivering a call, but the received call can be delivered to either of the two paired devices according to various methods employed for processing a received call.

The controller 180 of the watch-type mobile terminal 100 can provide a call waiting screen to the display 151, S15. Meanwhile, since the call waiting screen is provided to the watch-type mobile terminal 100 and the external electronic device 200 simultaneously, the call may not have been connected yet.

The controller 180 can carry out a call answering function due to an agent according to a predetermined input on the call waiting screen S16. Accordingly, the controller 180 can connect to the calling terminal 400 through a mobile communication unit S17.

Meanwhile, even if the watch-type mobile terminal 100 carries out an automatic answering mode due to an agent, the call waiting screen can be kept being displayed on the screen of the external electronic device 200, S18.

On the other hand, in case the user attempts to answer the call by deliberately using the external electronic device 200, S19, a call session is established between the external electronic device 200 and the calling terminal 400, S20, and call answering due to an agent in the watch-type mobile terminal 100 can be terminated automatically S21. The call attempt from the external electronic device 200 can include a case where a call button is pushed on the call waiting screen of the external electronic device and a case where the user grips the external electronic device. Accordingly, the call session between the watch-type mobile terminal 100 the calling terminal 400 is terminated S22.

FIG. 6 is an example of a call waiting screen provided to an external electronic device and a watch-type mobile terminal when a call is received by the external electronic device according to one embodiment of the present invention.

With reference to FIG. 6, in case the external electronic device 200 and the watch-type mobile terminal 100 receive a call, a call waiting screen displayed on each device can include a first graphic object 11 for connecting a call as a touch input is received and a second graphic object 12 for declining the call. Caller information can be displayed together on the call waiting screen. The caller information can include a name, phone number, image, and the like registered in the contact information.

Figure 7A:
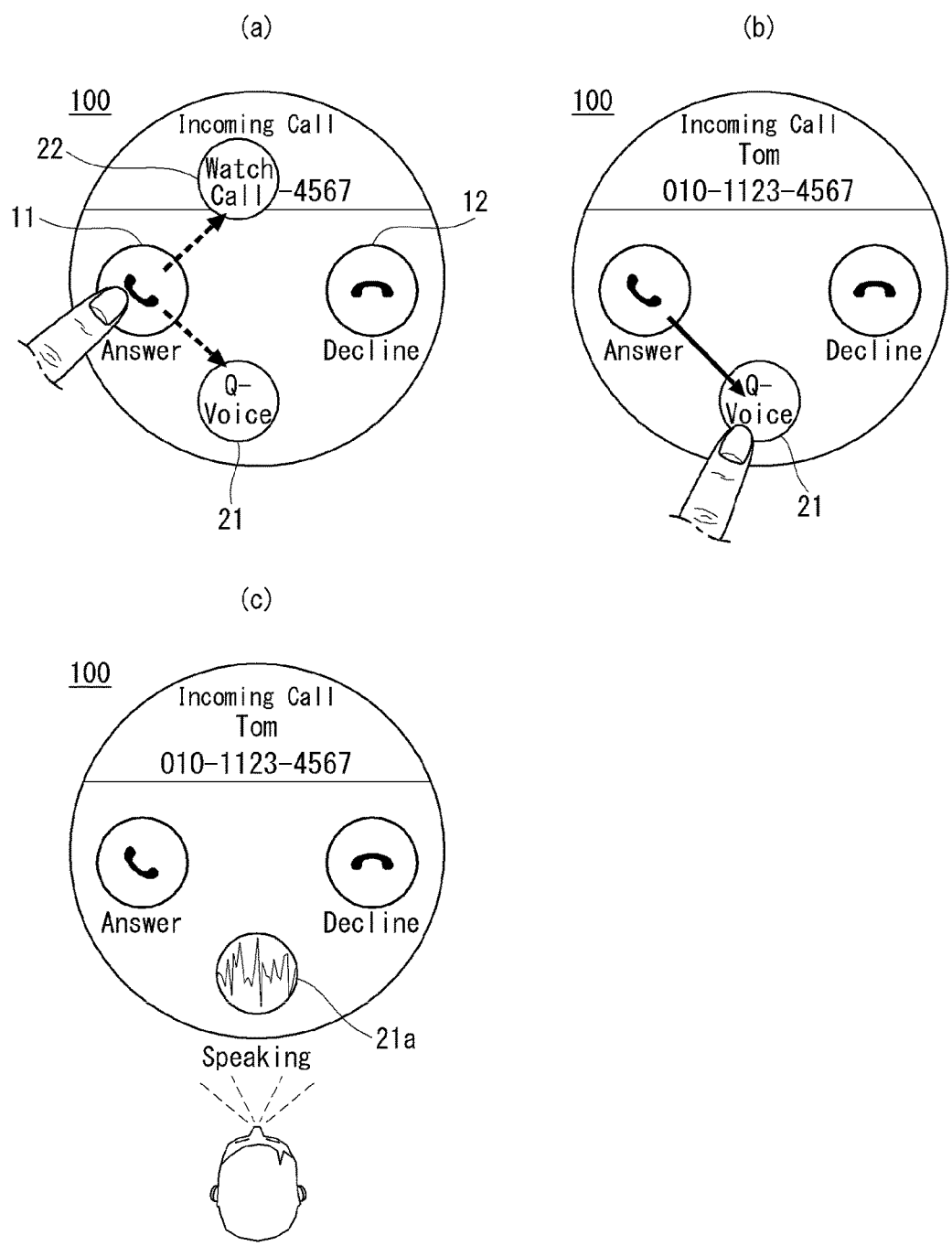
FIGS. 7a and 7b illustrate S110 and S120 of FIG. 4.
Figure 7B:
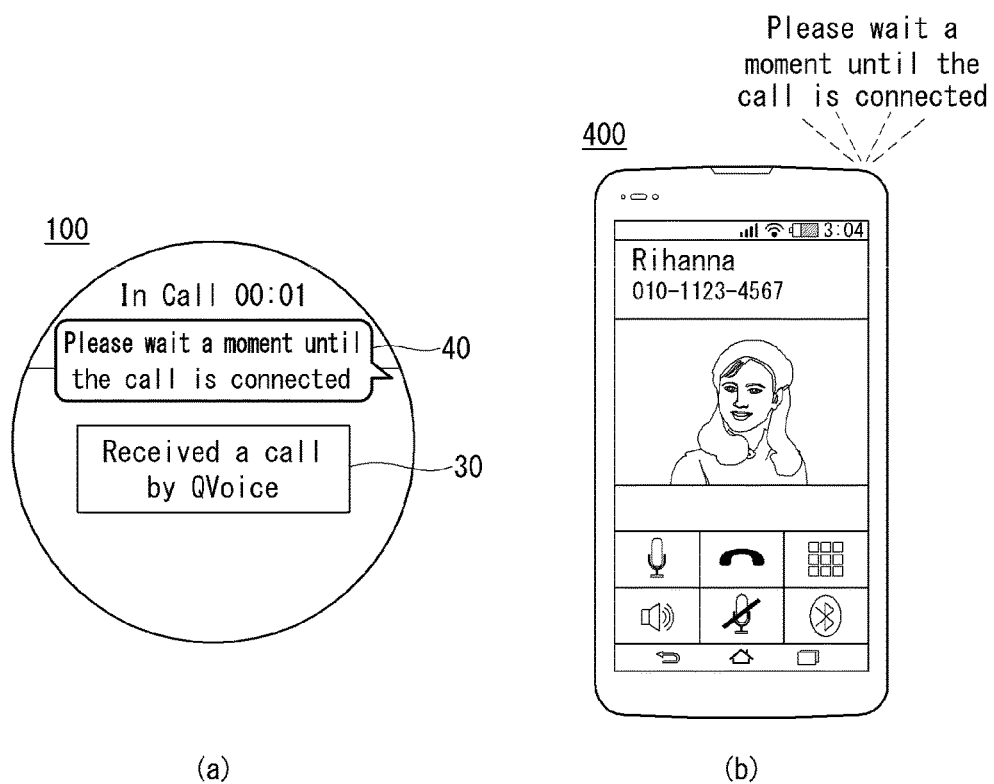

FIGS. 7a and 7b illustrate S110 and S120 of FIG. 4.

FIG. 7a is an example of a user interface for entering an automatic answering mode due to an agent in a call waiting screen, and FIG. 7b shows a screen where an automatic answering mode due to an agent has been carried out.

With reference to FIG. 7b, in case a call waiting screen provided to the display 151 of the watch-type mobile terminal 100 receives a predetermined input (for example, a long touch input with respect to the first graphic object 11) with respect to a first graphic object 11 for connecting to the call, the controller 180 can additionally display a third graphic object 21 and a fourth graphic object 22 (see (a) of FIG. 7a). The third graphic object 21 and the fourth graphic object 22 can be displayed in the vicinity of the first graphic object 11.

The third graphic object 21 is an object for executing an automatic answering mode due to an agent, and the fourth graphic object 22 is an object for answering directly through the watch-type mobile terminal 100.

In case a touch input with respect to the first graphic object 11 is dragged to the third graphic object 21 (see (b) of FIG. 7a), the controller 180 can carry out the automatic answering mode due to an agent. The automatic answering mode due to an agent can be executed in a voice recognition mode; in what follows, the third graphic object 21 can be represented by Q-Voice (Quick Voice), and it should be noted that a call in the automatic answering mode due to an agent can be called a call by Q-Voice.

By changing the appearance 21a of the third graphic object 21, the controller 180 can indicate that the automatic answering mode (Q-Voice) due to an agent is running (see (c) of FIG. 7a).

With reference to FIG. 7b, as the call by Q-Voice is run, the controller 180 can temporarily connect to the call and output on the display 151 a call waiting message 40 and a message 30 indicating that a call by Q-Voice is running. Meanwhile, since the call by Q-Voice is connected, a call waiting message is output to the calling terminal 400 through voice or in the form of a message.

Figure 8:
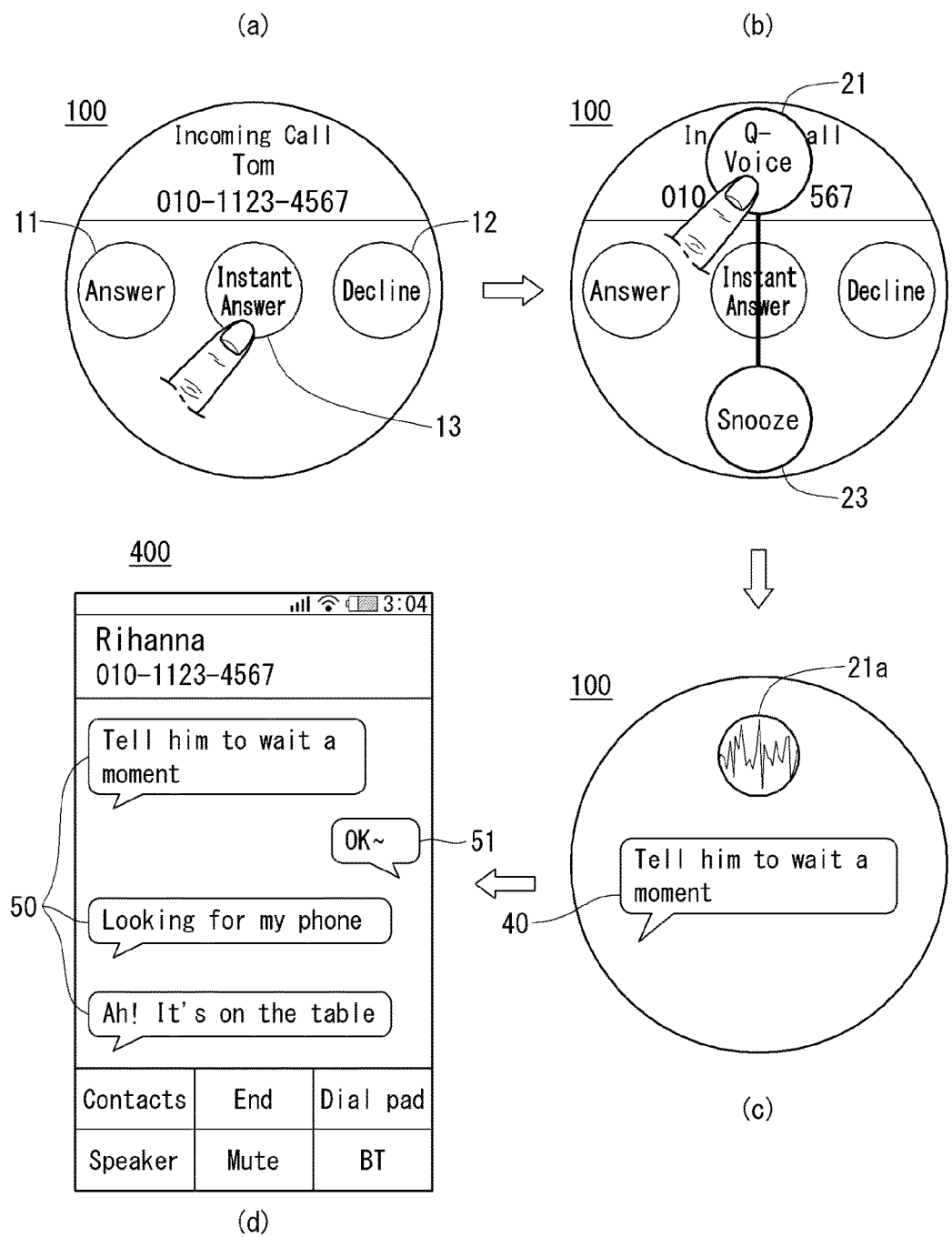
FIG. 8 illustrates another example of a user interface for entering an automatic answering mode due to an agent in a call waiting screen.

FIG. 8 illustrates another example of a user interface for entering an automatic answering mode due to an agent in a call waiting screen.

With reference to FIG. 8(a), the controller 180 can provide the call waiting screen with a sixth graphic object 13 by which a call can be connected temporarily together with a first graphic object 11 for connecting to an incoming call and a second graphic object 12 for declining the incoming call. In other words, the controller 180 can provide three graphic objects to the call waiting screen.

With reference to FIG. 8(b), in case a touch input is received through the sixth graphic object 13, the controller 180 can additionally provide a third graphic object 21 for carrying out the call by Q-Voice described above and a seventh graphic object 23 for delaying the call temporarily. The third graphic object 21 and the seventh graphic object 23 can be displayed in the vicinity of the sixth graphic object 13.

With reference to FIG. 8(c), in case the third graphic object for carrying out a call by Q-Voice is selected, the controller 180 can display on the display 151 the third graphic object 21a of which the appearance has been changed and a text message 40 obtained from the user's voice input in a voice recognition mode. In other words, the call answering by Q-Voice recognizes the user's voice and delivers a text message converted from the user's voice to the caller, thereby carrying out the role of a go-between the user and the caller.

With reference to FIG. 8(d), a conversion result from the call answering by Q-Voice to a text message can be provided to the screen of the caller terminal 400. The result can be provided to a call screen. The call screen can further provide a menu from which the user can select call duration, caller contact information, speaker mode setting, call ending, and so on.

In what follows, an example of answering a call by Q-Voice will be described in more detail.

Figure 9A:
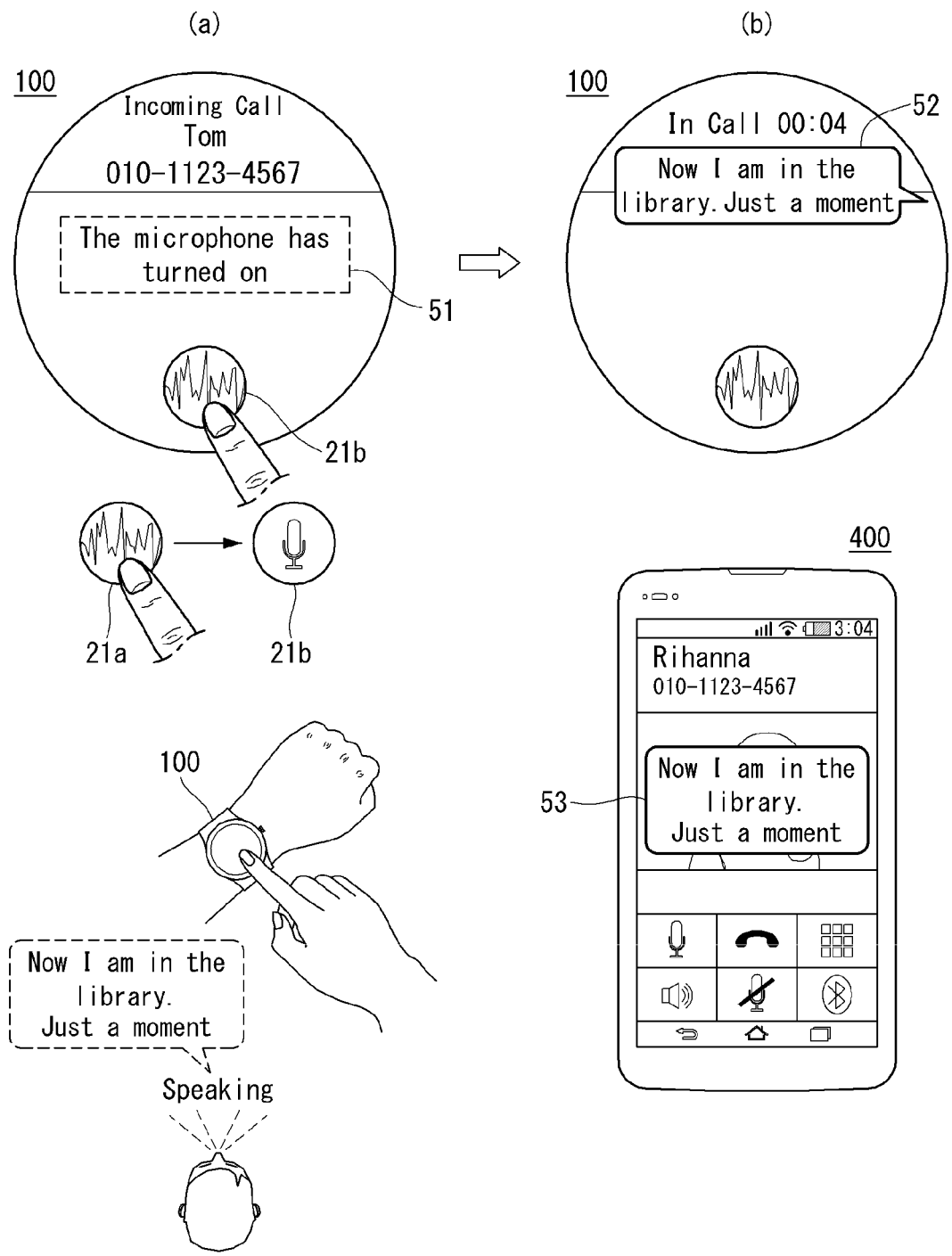
FIGS. 9a and 9b illustrate an example of answering a call through voice recognition in an automatic answering mode due to an agent.
Figure 9B:
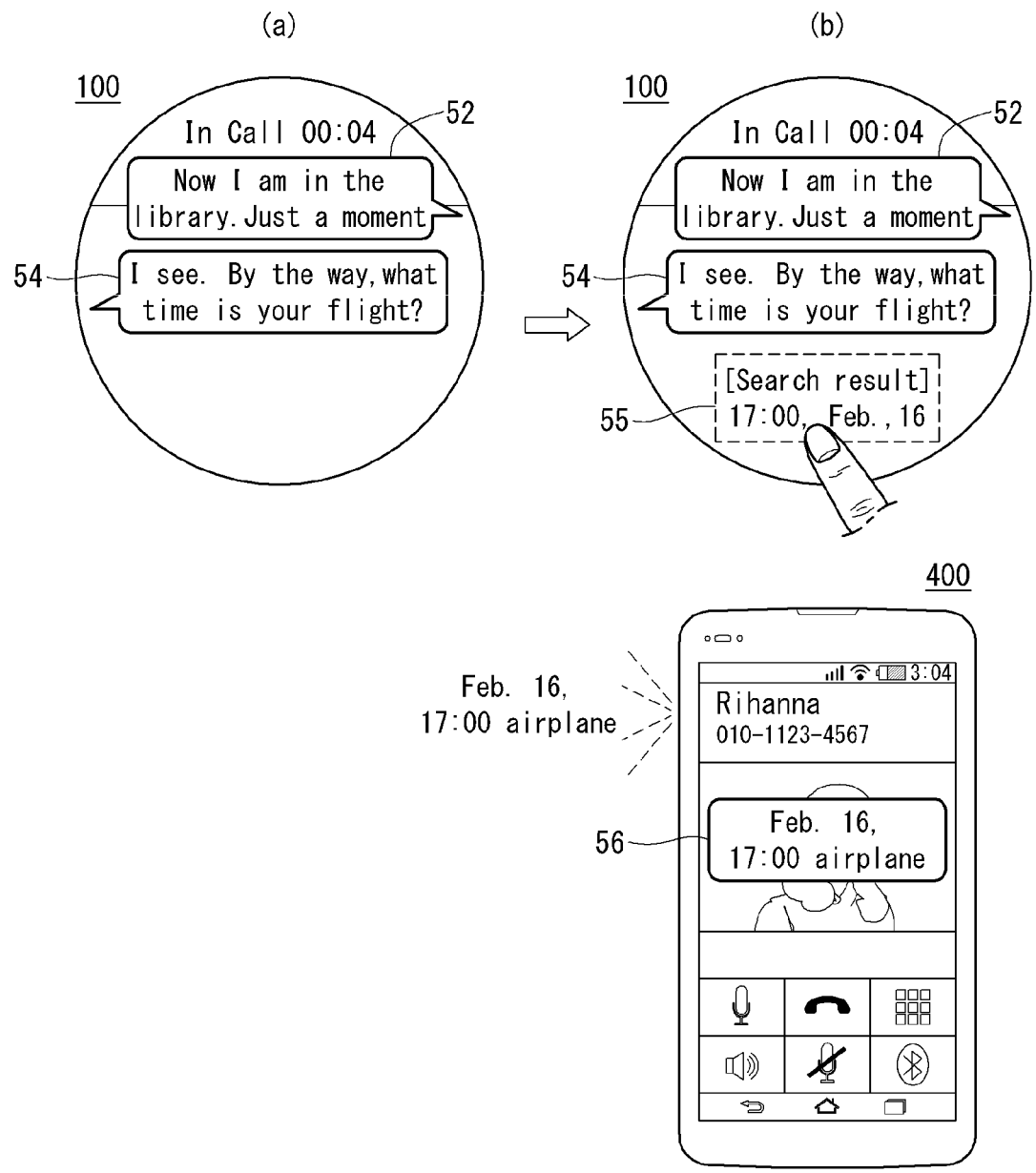

FIGS. 9a and 9b illustrate an example of answering a call through voice recognition in an automatic answering mode due to an agent.

With reference to a of FIG. 9a, in case a long touch input is applied to the third graphic object 21a indicating that Q-Voice is running, the controller 180 can additionally display the third graphic object 21b of which the appearance has been changed and activate a microphone. As the appearance of the third graphic object 21b is changed to a microphone shape, a message 51 indicating that a microphone has been activated can be displayed on the display 151. As the microphone is activated, the user can utter his/her voice while maintaining a touch input on the third graphic object 21b.

With reference to (b) of FIG. 9a, the controller 180 can display the text message 52 converted from the user's voice on the display. At this time, what the user has said 53 can be displayed also on the call screen of the caller terminal 400. Similarly, as shown in (b) of FIG. 9b, Q-Voice can convert a conversation between the user and the caller into text 52, 54, and the converted conversation can be provided to the call screen.

Meanwhile, with reference to (b) of FIG. 9b, the call function due to Q-Voice (automatic answering mode due to an agent) according to one embodiment of the present invention can analyze the call conversation to carry out a function for providing contents based on the call conversation. For example, in case the call conversation includes schedule information, the controller 180 can search for schedule information on the basis of schedule information of the user registered in a schedule application. Also, the controller 180 can provide the search result 5 to the call screen.

In case the search result 55 is selected, the controller 180 can transmit the call conversation to the caller terminal 400 by including the search result therein. The caller terminal 400 may display the search result 56 on the display or output the search result in the form of sound.

FIG. 10 illustrates an example where an incoming call is forced to be connected to a watch-type mobile terminal in case a call response is related to an emergency in an automatic answering mode due to an agent.

With reference to FIG. 10, as a call by Q-Voice proceeds, the user's command and a response of a correspondent can be converted into text and provided to the call screen. As described above, the Q-Voice can analyze call conversation and provide an appropriate response depending on the context of the call conversation. For example, in case an emergency is detected from the call conversation, the controller 180 can terminate the call by Q-Voice and force a call session to be established so that the user can directly talk through the watch-type mobile terminal 100.

Figure 11:
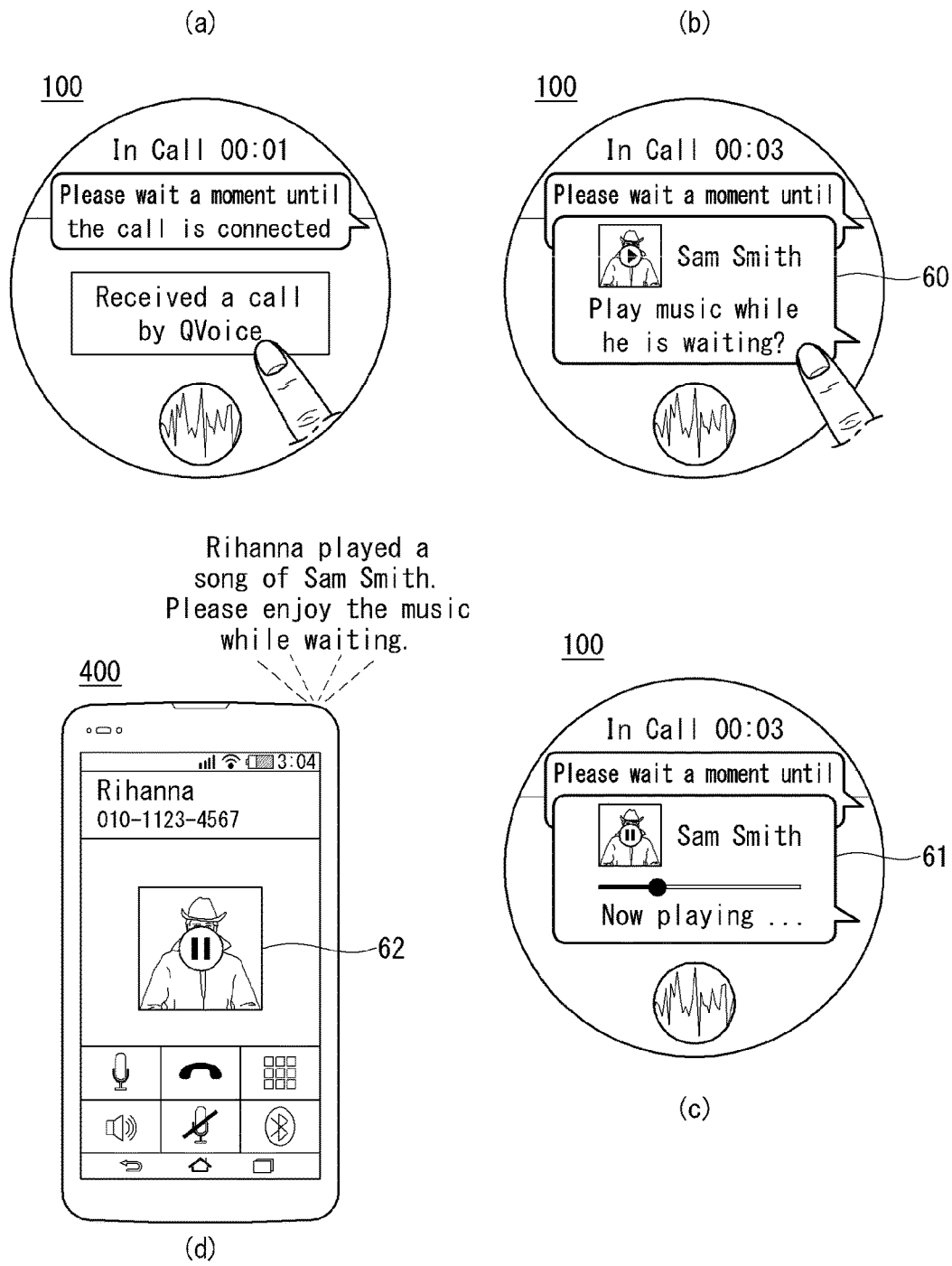
FIG. 11 illustrates an example of a watch-type mobile terminal's sharing contents while answering a call in an automatic answering mode due to an agent.

FIG. 11 illustrates an example of a watch-type mobile terminal's sharing contents while answering a call in an automatic answering mode due to an agent.

With reference to FIG. 11(a), in case a predetermined input (for example, a long touch input on the call screen) is received through the call screen after a call by Q-Voice is carried out, the controller 180 can play predetermined contents while a call by Q-Voice is carried out. With reference to FIG. 11(b), the controller 180 can display contents recommended by the Q-Voice on the call screen and provide a window 60 inquiring whether to play the recommended contents. As the window 60 is selected or the user's voice input (for example, YES) is received, the controller 180 can play the recommended contents. With reference to FIG. 11(c), the controller 180 can provide a play screen 61 of the recommended contents to the display 151. Also, the caller terminal 400 can output a contents play screen 62 on the display. Also, the caller terminal 400 can display a message notifying that predetermined contents are shared by the call recipient.

The contents recommended by the Q-Voice can include music, news, SNS contents related to the call correspondent, and image. In other words, while a call is processed temporarily by the Q-Voice before the user actually participates in the call conversation, the controller 180 can recommend and provide appropriate contents by taking into account the time for which the call correspondent has to wait.

So far, examples of carrying out a call with a caller in an automatic answering mode due to an agent (Q-Voice) have been described. However, it should be noted that the automatic answering mode due to an agent does not refer to a completely open state of a call session in which the user directly participates in a call conversation, but is related to a temporary call carried out temporarily by running an agent application before the user actually participates in the call conversation. Therefore, according to one embodiment of the present invention, in case the automatic answering mode due to an agent lasts for more than a predetermined time period, the controller 180 recognizes that the user fails to find his/her mobile phone (the external electronic device 200 in this document) and controls the watch-type mobile phone to find the external electronic device 200.

Figure 12A:
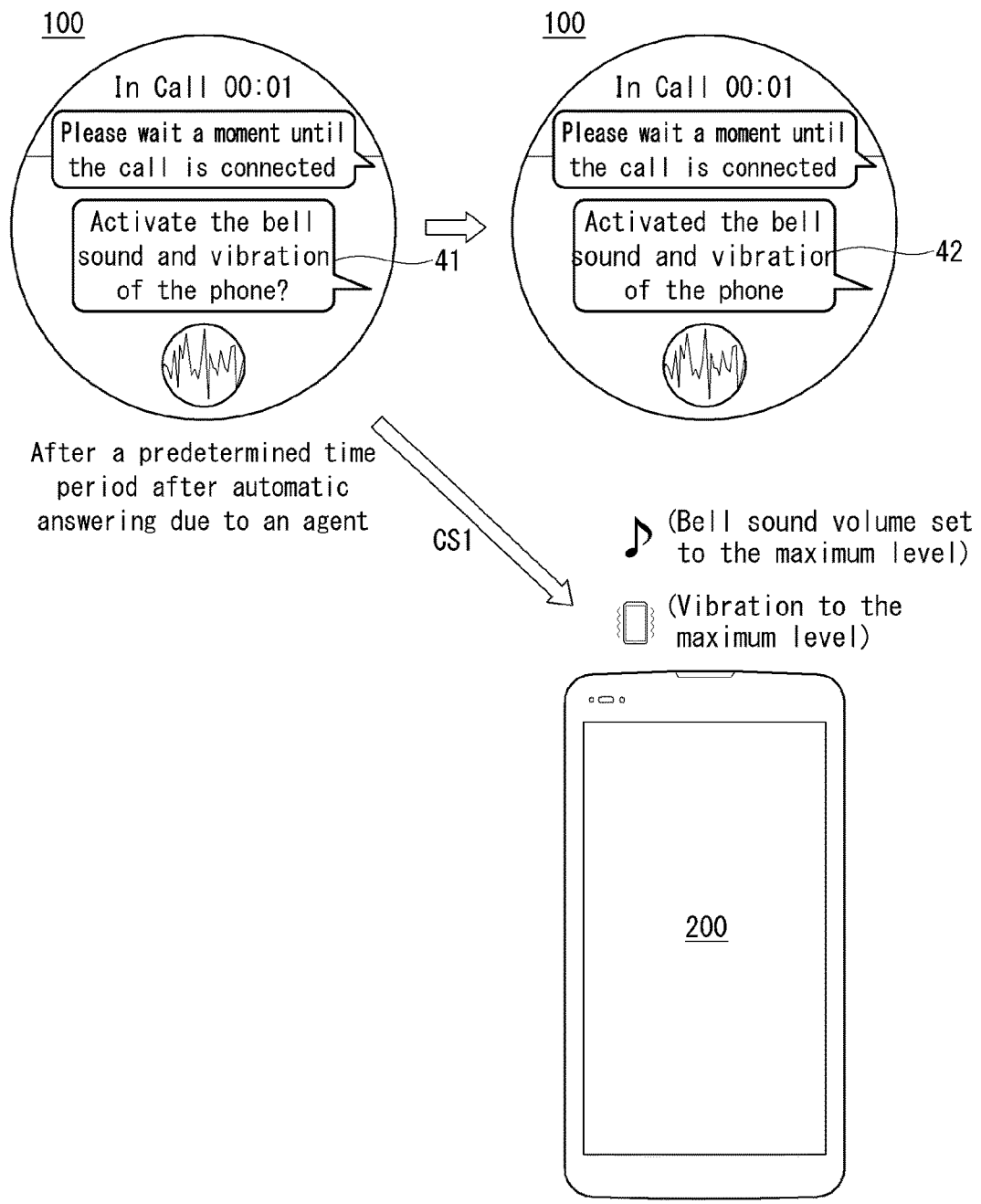
Figure 12B:
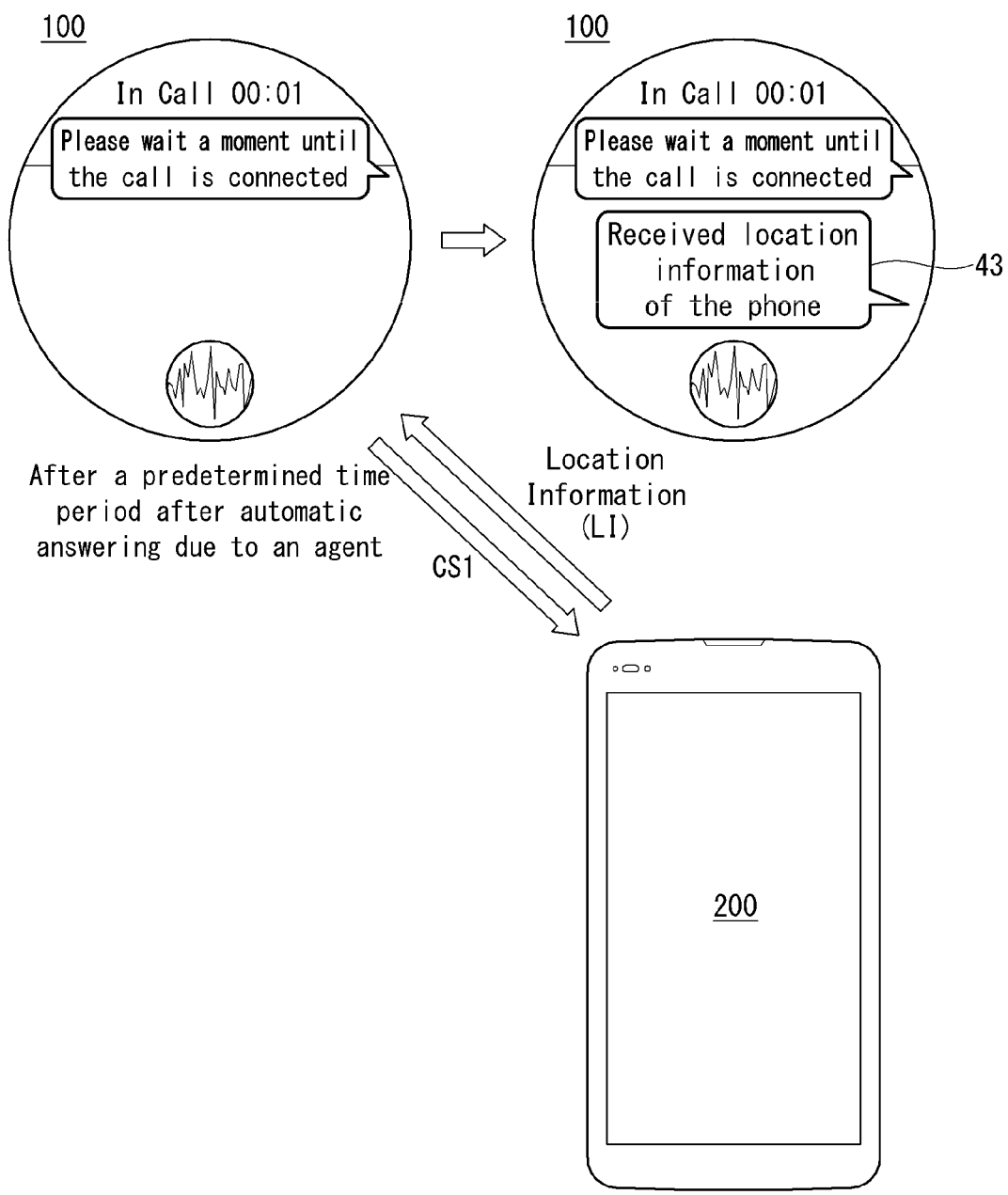

FIGS. 12a to 12c illustrate operation of a watch-type mobile terminal in case an automatic answering mode due to an agent lasts for more than a predetermined time period.

With reference to FIG. 12a, in case an automatic answering mode due to an agent lasts for more than a predetermined time period, the controller 180 can display a message 41, 42 related to activation of bell sound and vibration of a paired external electronic device 200. The controller 180 can transmit a control signal CS1 for controlling an output signal of the paired external electronic device 200 to the external electronic device 200. The external electronic device 200 may adjust sound output volume of a sound output unit to the maximum level according to the received control signal CS1 or adjust vibration output of a haptic module to the maximum level. Through the sound output or vibration output, the user can detect the location of the external electronic device 200.

With reference to FIG. 12b, in case the automatic answering mode due to an agent lasts for more than a predetermined time period, the controller 180 can transmit a control signal CS2 requesting location information of the paired external electronic device 200 to the external electronic device 200. The external electronic device 200 can transmit location information LI to the watch-type mobile terminal 100 according to the received control signal CS2. The controller 180 enables the user to find the paired external electronic device 100 more conveniently by displaying the location information received from the external electronic device 200 on the display 151.

Meanwhile, with reference to FIG. 12c, in case the automatic answering mode due to an agent lasts for more than a predetermined time period, at least one emoticon can be provided to the call screen of the caller terminal 400. The emoticon 70 shows the emotional state of a caller due to the call delay for the user. A particular emoticon 71 from the caller terminal 400 can be delivered and displayed on the display 151. The controller 180 can output a message 72 encouraging hurrying up a call connection on the display 151 along with the particular emoticon 71.

FIG. 13 illustrates S130, S140 of FIG. 4.

With reference to FIG. 13, while a call is processed in an automatic answering mode due to an agent, the controller 180 can detect that the paired external electronic device 200 has attempted to connect the call. For example, the call attempt from the external electronic device 200 can include a case where the user grips the external electronic device 200 or a case where the user pushes a call button on the call waiting screen of the external electronic device 200. The controller 180 can terminate the automatic answering mode due to an agent (call answering by Q-Voice) carried out in the watch-type mobile terminal 100.

Figure 14:
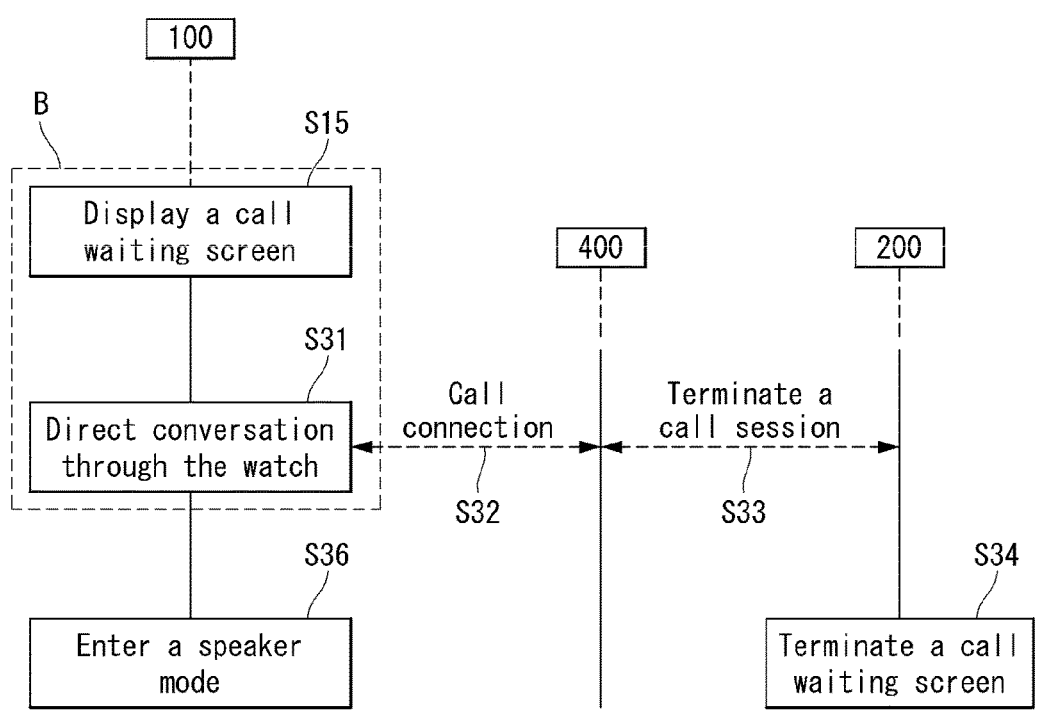
FIG. 14 is a flow diagram of a method for controlling a watch-type mobile terminal according to a second embodiment.
Figure 15:
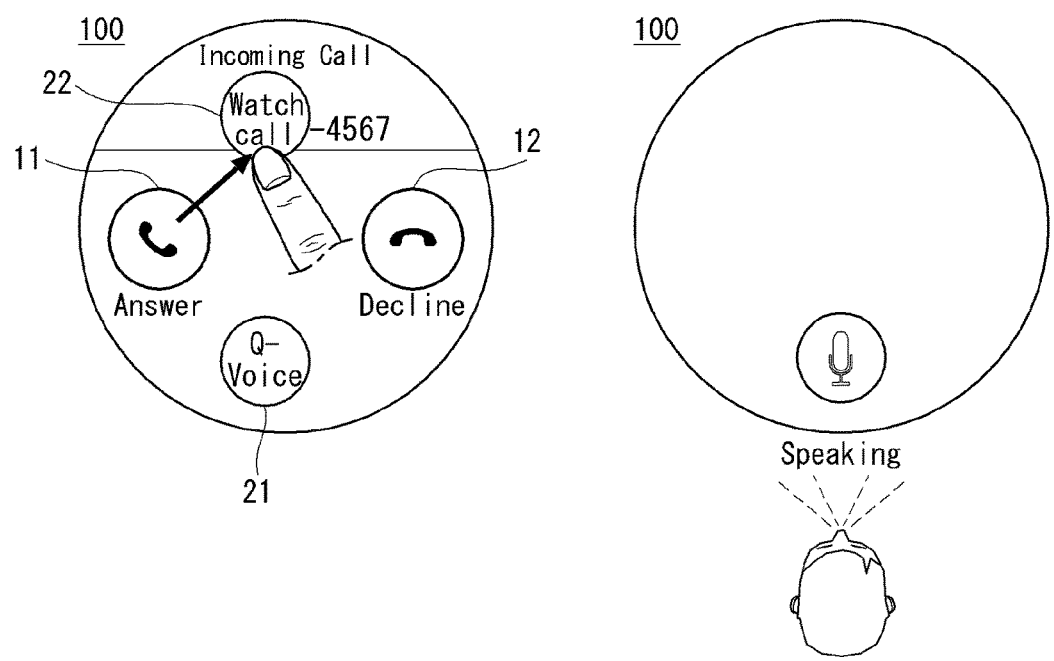
FIG. 15 illustrates an example of implementing a method for controlling a watch-type mobile terminal according to a second embodiment of the present invention.

FIG. 14 is a flow diagram of a method for controlling a watch-type mobile terminal according to a second embodiment. FIG. 15 illustrates an example of implementing a method for controlling a watch-type mobile terminal according to a second embodiment of the present invention.

A method for controlling a watch-type mobile terminal according to a second embodiment of the present invention can be implemented in the watch-type mobile terminal 100 described with reference to FIGS. 1 to 3. In what follows, described with reference to related drawings will be a method for controlling a watch-type mobile terminal according to a second embodiment of the present invention and operation of the watch-type mobile terminal 100 for implementing the method. The second embodiment of the present invention can be implemented on the basis of the first embodiment.

With reference to FIG. 14, while the external electronic device 200 is paired with the watch-type mobile terminal 100, a call can be received. The controller 180 can provide a call waiting screen to the display 151, S15. The controller 180 can connect to the call directly in the watch-type mobile terminal 100 through the user interface provided on the call waiting screen S31. Accordingly, a call is connected between the call receiving terminal 400 and the watch-type mobile terminal 100, S32, and the call session between the external electronic device 200 and the call receiving terminal 400 is terminated S33. Also, the external electronic device 200 can also terminate displaying the call waiting screen S34.

With reference to FIG. 15, in case a predetermined input (for example, a long touch input) with respect to a first graphic object 11 for connecting to a received call is received, the controller 180 can provide the display 151 with a third graphic object 21 corresponding to an automatic answering mode due to an agent and a fourth graphic object 22 for direct conversation through the watch-type mobile terminal 100. In case an input for selecting the fourth graphic object 22 is received, the controller 180 activates a microphone and controls the microphone so that the received call can be processed in a speaker mode (S36 of FIG. 14).

Figure 16:
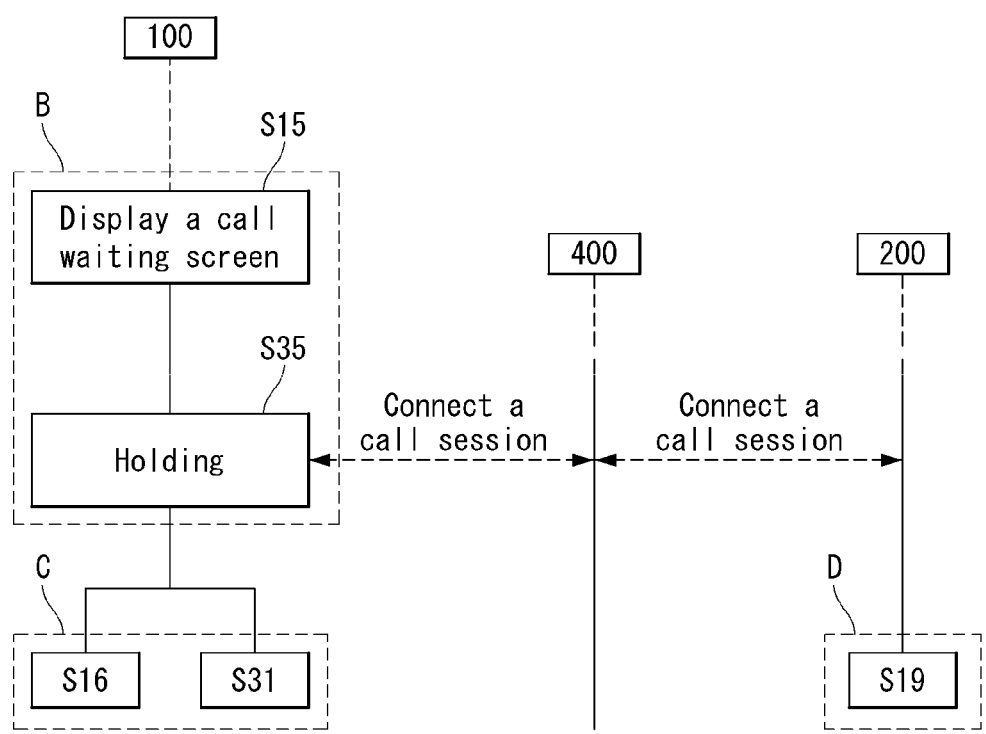
FIG. 16 is a flow diagram of a method for controlling a watch-type mobile terminal according to a third embodiment.

FIG. 16 is a flow diagram of a method for controlling a watch-type mobile terminal according to a third embodiment.

The third embodiment of the present invention can be based on the first and/or second embodiment above, and can be realized as a combination with at least one of the first and the second embodiment.

With reference to FIG. 16, a call can be received while the external electronic device 200 is paired with the watch-type mobile terminal 100. The controller 180 can provide a call waiting screen to the display 151, S15. The controller 180 can temporarily hold the call received by the watch-type mobile terminal 100 through a user interface provided on the call waiting screen S35. In this case, a call connection between the call receiving terminal 400 and the watch-type mobile terminal 100 is maintained, and a call connection between the external electronic device 200 and the call receiving terminal 400 can also be maintained. Meanwhile, while the received call is being kept in a holding state, the controller 180, through the user interface provided on the call waiting screen, can enter an automatic answering mode due to an agent S16, carry out a call conversation directly through the watch-type mobile terminal 100, S31, or connect to a received call through the external electronic device 200 as call conversation is attempted through the paired external electronic device 200.

Figure 17:
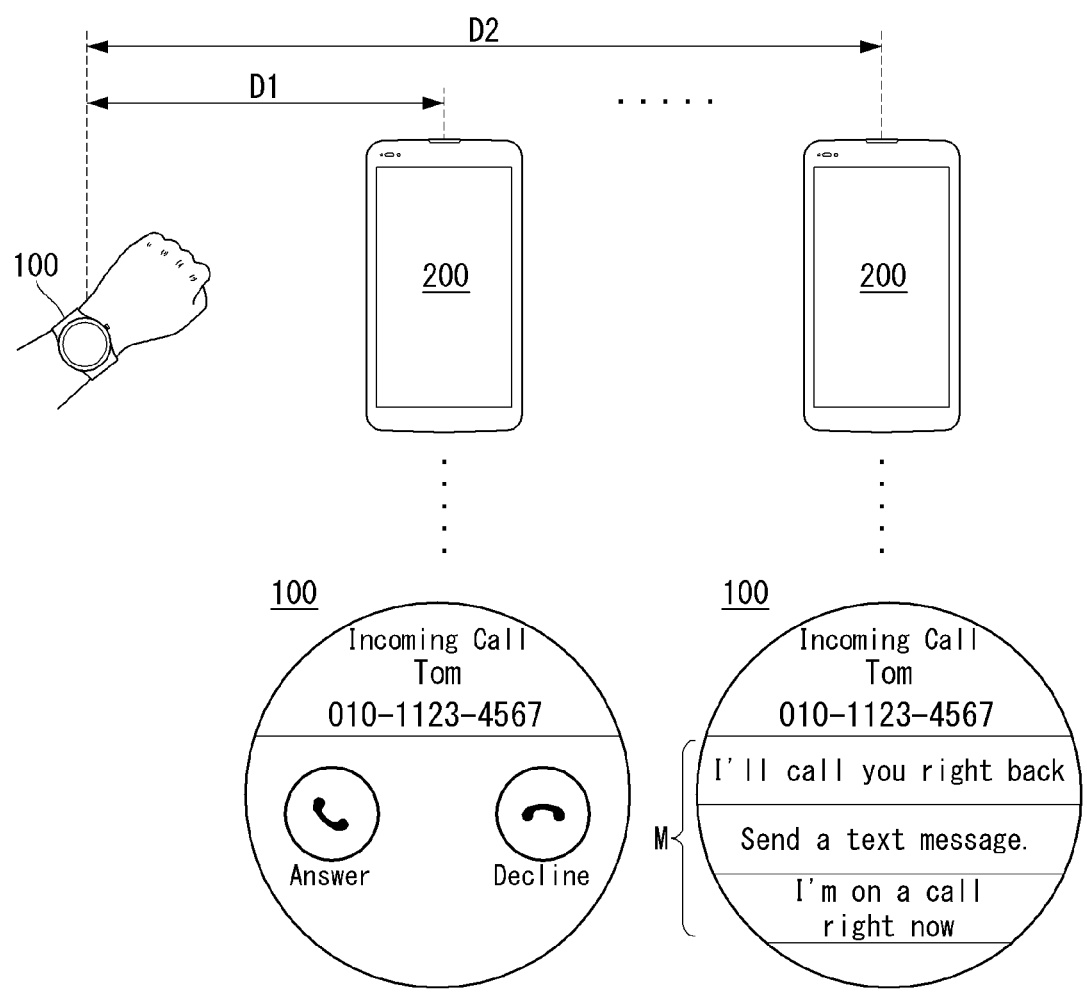
FIG. 17 is a fourth embodiment of the present invention, illustrating a composition of a call waiting screen of a watch-type mobile terminal according to a distance to an external electronic device.

FIG. 17 is a fourth embodiment of the present invention, illustrating a composition of a call waiting screen of a watch-type mobile terminal according to a distance to an external electronic device.

The fourth embodiment of the present invention can be implemented in the watch-type mobile terminal 100 described with reference to FIGS. 1 to 3. The fourth embodiment can be realized on the basis of the first, the second, and/or the third embodiment described above and as a combination with at least one of the first, the second, and the third embodiment.

With reference to FIG. 17, the watch-type mobile terminal 100 can be located at a position separated by a predetermined distance from the paired external electronic device 200. The distance D1, D2 between the watch-type mobile terminal 100 and the external electronic device 200 can be obtained from a transmitted/received signal between both terminals connected to each other through pairing.

While the distance corresponds to a first distance D1, in case the external electronic device 200 receives a call, the watch-type mobile terminal 100 can display at least one call waiting screen described with reference to FIG. 6, 7, or 8 on the display 151. Meanwhile, in case the external electronic device 200 receives a call while the distance corresponds to a second distance D1, the watch-type mobile terminal 100, determining that the user wearing the watch-type mobile terminal 100 is at a long distance from the external electronic device 200 to receive a call, can provide a call declining message list M to the display 151. In case a particular message is selected from the call declining message list M, the controller 180 can transmit the selected message to the caller terminal 400 and terminate the call.

Figure 18:
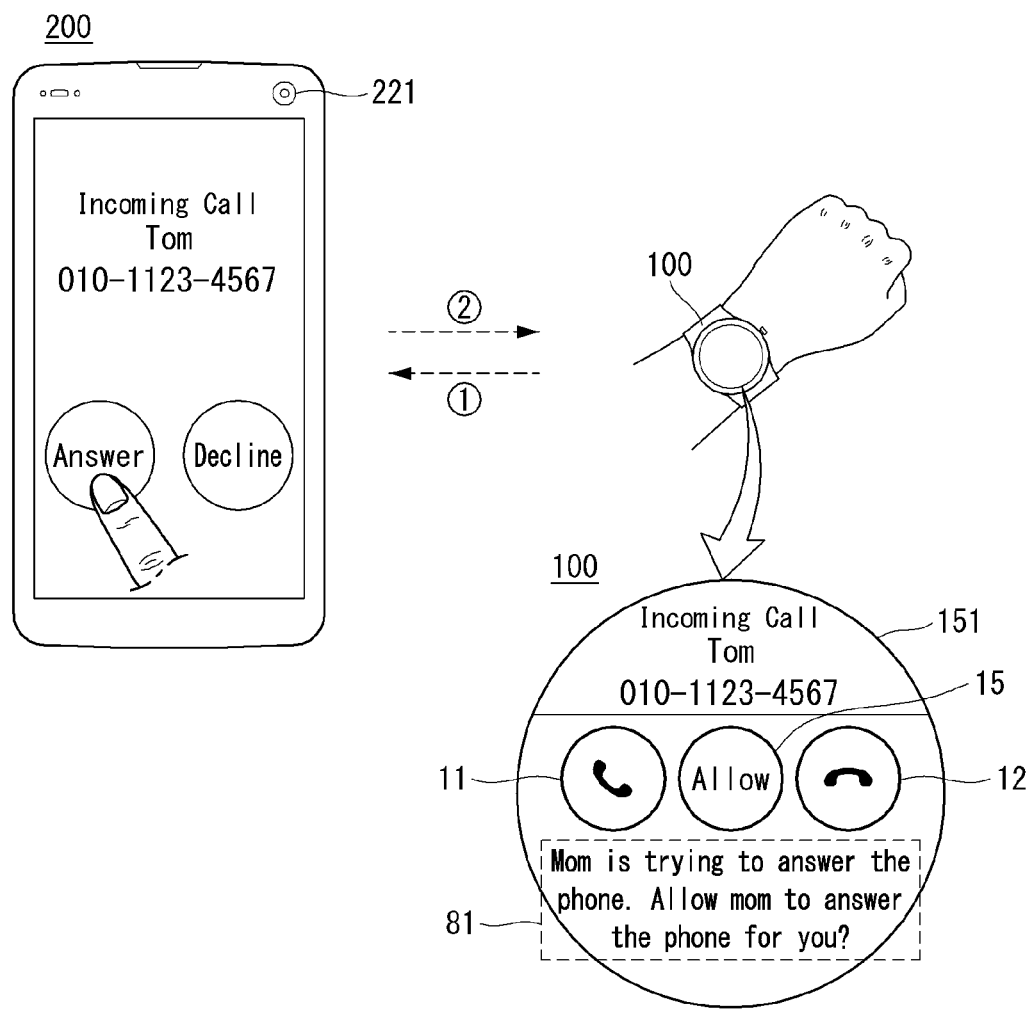
FIG. 18 is a fifth embodiment of the present invention, illustrating operation of a watch-type mobile terminal in case a third person attempts call connection through an external electronic device.

FIG. 18 is a fifth embodiment of the present invention, illustrating operation of a watch-type mobile terminal in case a third person attempts call connection through an external electronic device.

The fifth embodiment of the present invention can be implemented in the watch-type mobile terminal 100 described with reference to FIGS. 1 to 3. The fifth embodiment can be realized on the basis of the first, the second, the third and/or the fourth embodiment described above and as a combination with at least one of the first, the second, third, and the fourth embodiment.

With reference to FIG. 18, while a call waiting screen is displayed on the watch-type mobile terminal 100, the controller 180 can recognize various operation signals received through the paired external electronic device 200. For example, the controller can detect reception of an input for connecting a call received from the external electronic device 200. In this case, the controller 180 can capture an image by driving a camera 221 of the paired external electronic device 200 and transmit a control signal requesting transmission to the external electronic device 200 (①). The controller 180 can receive an image captured through the camera of the external electronic device 200 (②). The controller 180 can display the received image on the call waiting screen (on the display). Accordingly, the user wearing the watch-type mobile terminal 100 can recognize a third person who attempts a call connection through the external electronic device 200.

Meanwhile, in case a call connection is attempted through the external electronic device 200, the watch-type mobile terminal 100 can receive a request for approving the call connection from the external electronic device 200. Also, the controller 180 can display a graphic object 15 for responding to the approval request and a message 81 inquiring whether to allow a call attempt of the third person on the call waiting screen of the display 151 in addition to the first graphic object 11 and the second graphic object described above. The controller 180 can output a control signal which allows the paired external electronic device 200 to carry out a call connection according as the graphic object 15 is selected.

So far, through the first to the fifth embodiment of the present invention, this document has described an example of handling a received call in such a situation where a smart phone paired with a smart watch is separated from the smart watch by more than a predetermined distance or the user is unable to find the paired smart phone. In what follows, described will be examples of how the smart phone controls access to the smart phone in case a third person accesses the smart phone while the smart phone and the smart watch are separated from each other by more than a predetermined distance.

Figure 19:
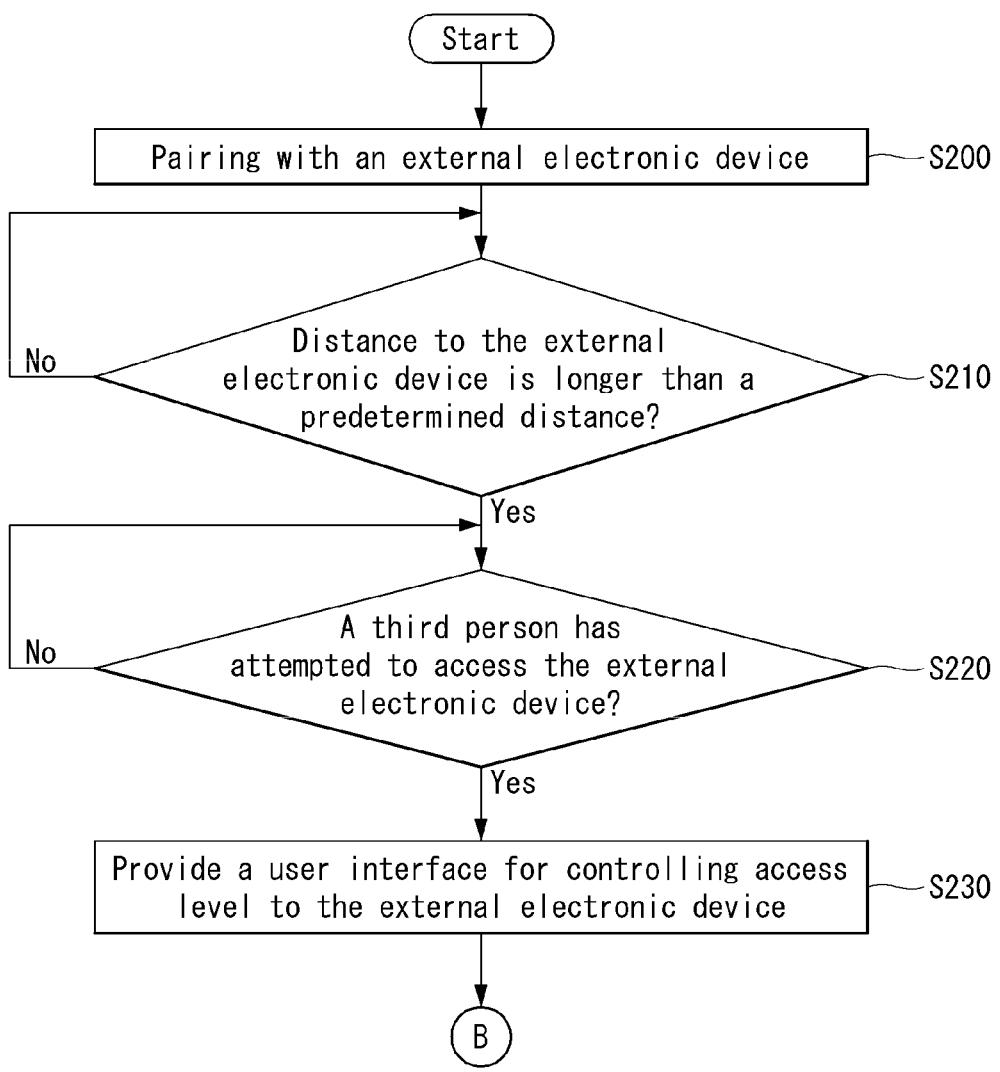
FIG. 19 is a flow diagram of a method for controlling a watch-type mobile terminal according to a sixth embodiment of the present invention.

FIG. 19 is a flow diagram of a method for controlling a watch-type mobile terminal according to a sixth embodiment of the present invention.

A method for controlling a watch-type mobile terminal according to a sixth embodiment of the present invention can be implemented in the watch-type mobile terminal described with reference to FIGS. 1 to 3. In what follows, described in detail with reference to related drawings will be a method for controlling a watch-type mobile terminal according to a sixth embodiment of the present invention and operation of the watch-type mobile terminal 100 for implementing the method. The sixth embodiment of the present invention can be realized on the basis of the first to the fifth embodiment described above and as a combination with at least one of the first to the fifth embodiment.

With reference to FIG. 19, the controller 180 carries out pairing with an external electronic device 200, S200. Since the step of S200 corresponds to the S100 step of FIG. 4, further description thereof will be omitted.

The controller 180 determines whether the distance to the paired external electronic device 200 is longer than a predetermined distance S210. The distance to the external electronic device 200 can be obtained from a transmitted/received signal between both terminals connected to each other through pairing.

In case the distance between the watch-type mobile terminal 100 and the external electronic device 200 is longer than a predetermined distance, the controller 180 can determine whether a third person has accessed the external electronic device 200, S220.

The access to the external electronic device 200 can be signified by the operation of releasing lock state of the external electronic device 200, a specific application provided by the external electronic device 200, access to particular contents, and so on.

The controller 180 can provide a user interface for controlling access to the external electronic device 200 to the display 151, S230. The user can then control access to the external electronic device 200 through the user interface.

In what follows, described will be a method for controlling access to the external electronic device 200 through the watch-type mobile terminal 100 while the watch-type mobile terminal 100 and the external electronic device 200 are separated from each other by more than a predetermined distance.

Figure 20:
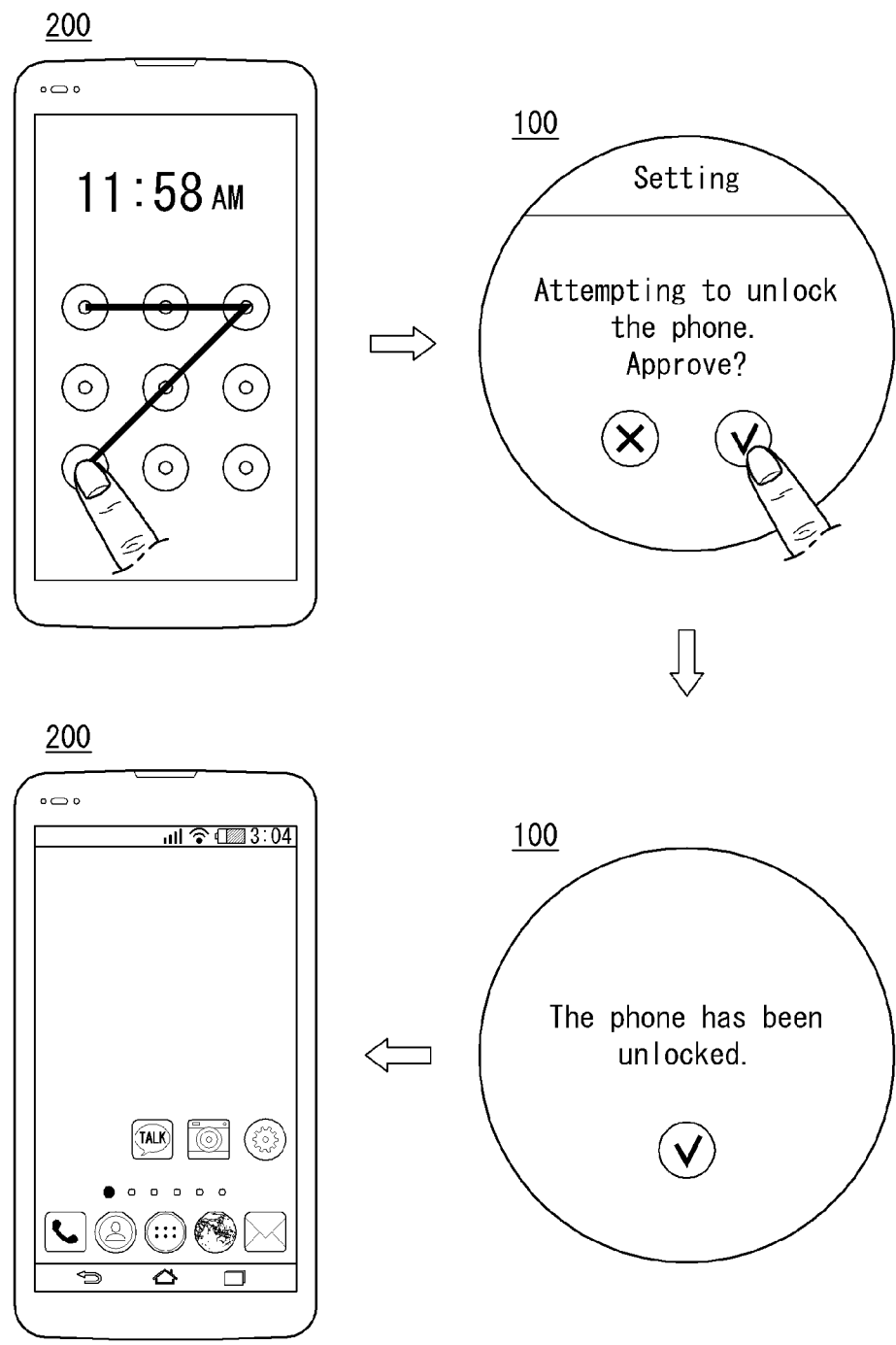
FIG. 20 illustrates operation of a watch-type mobile terminal in case a third person attempts to unlock a lock state of an external electronic device.

FIG. 20 illustrates operation of a watch-type mobile terminal in case a third person attempts to unlock a lock state of an external electronic device.

With reference to FIG. 20, the external electronic device 200 can provide a lock screen to the display while being in a lock state. The controller 180 can detect operation of the paired external electronic device 200. In case an input for releasing the lock screen is detected on the external electronic device 200, the controller 180 can provide a menu for allowing the attempt for releasing the lock screen of the external electronic device 200 to the display 151.

In case the user approves the attempt through the menu and a lock release pattern input to the external electronic device 200 matches a pre-stored pattern, the controller 180 can transmit a control signal for releasing the lock state to the external electronic device 200. Meanwhile, in case the user declines the attempt through the menu, the controller 180 can transmit a control signal which forces the lock state to be retained to the external electronic device 200 even if the input lock release pattern matches the pre-stored pattern.

Figure 21A:
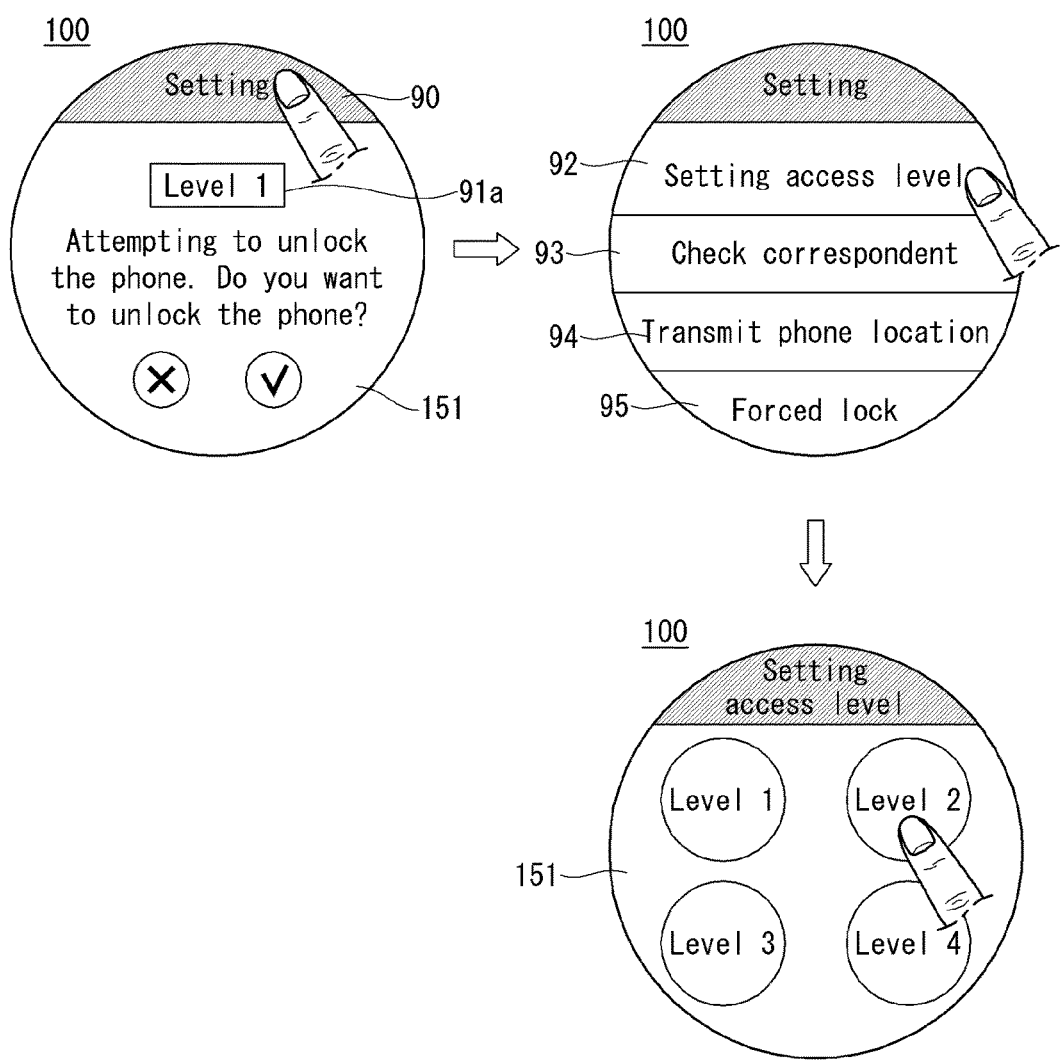

FIGS. 21*a* and 21*b* illustrate an example of setting access levels to an external electronic device through a watch-type mobile terminal according to one embodiment of the present invention.

With reference to FIG. 21*a*, determining that a third person has accessed the external electronic device 200, the controller 180 can provide a user interface through which an access level of the third person can be set to the display 151. As one example, the controller 180 can provide the user interface with a menu 91 with which the user can set access levels and information about the current security level 91*a* of the external electronic device 200.

After the menu 91 for setting an access level is selected, the controller 180 can display on the display 151 at least one control menu 92, 93, 94, 95 for controlling access to the external electronic device 200. The control menu can include at least one of a menu 92 for setting access level, a menu 93 for checking a third person who has accessed the external electronic device 200, a menu 94 for requesting the location of the external electronic device 200, and a menu 95 for forcibly converting the external electronic device 200 into the lock state. The user can set the security level of the external electronic device 200 by selecting a specific menu through the watch-type mobile terminal 100.

In one embodiment, the menu 92 for setting access level can provide a plurality of sub-menus by which the external electronic device 200 can be set to the security level appropriate for a configured access level by dividing the access level into multiple steps. The security measures for each security level can be set by the user. For example, in the case of a first security level, the lock state may not be set to the display of the external electronic device 200. Similarly, in the case of a second security level, the lock state can be set to the display of the external electronic device 200 and a lock screen is provided. In the case of a third security level, access to a specific application or contents through the external electronic device 200 can be blocked in addition to the measure of the second security level. Also, in the case of a fourth security level, use of the external electronic device 200 can be blocked except for a person designated by the user or a pre-registered user.

Also, in case the menu 93 for checking a third person who has accessed the external electronic device 200 is selected from among the control menu, the controller 180 can output a control signal for capturing and transmitting an image of the third person through the camera of the external electronic device 200. Also, the menu 94 for requesting the location is used to display the location of the external electronic device 200 on a map. Also, the menu 95 for forcibly converting the external electronic device 200 into the lock state can make the lock state unreleased by a predetermined code or touch pattern and require an additional authentication procedure.

With reference to FIG. 21*b*, the controller 180 may set the security level of the external electronic device 200 through selection of a specific menu as described in FIG. 21*a*, the security level can be set differently according to a predetermine pattern input along the edge of the display 151. For example, a drag input in the clockwise direction along the edge of the display 151 may correspond to increase the security level, whereas a drag input in the counterclockwise direction may correspond to decrease the security level.

Figure 22:
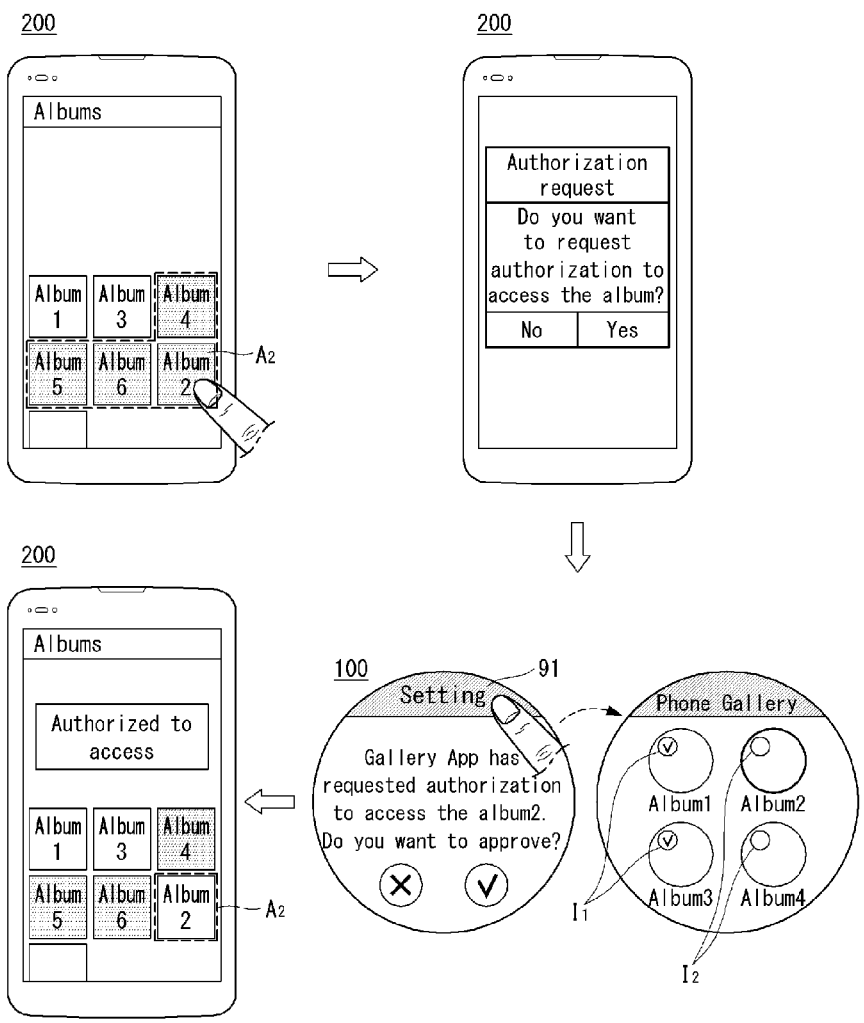
FIG. 22 illustrates operation of a watch-type mobile terminal in case a third person attempts to access specific contents stored in an external electronic device.

FIG. 22 illustrates operation of a watch-type mobile terminal in case a third person attempts to access specific contents stored in an external electronic device.

With reference to FIG. 22, according to one embodiment of the present invention, even if the lock state of the paired external electronic device 200 is released, specific contents (including applications) can still be blocked for use in the external electronic device 200.

For example, among a plurality of albums included in a gallery application, some albums may be accessed restrictively. In case those albums are accessed through the external electronic device 200, the external electronic device 200 can request access authority from the watch-type mobile terminal 100.

Accordingly, the controller 180, in response to the request, can approve the access authority for the requested album. For example, if a setting menu 92 is selected, the first to the fourth album can be displayed being grouped into albums allowed for access by a third person and those not. In other words, a predetermined indicator I1, I2 can be allocated to each album to signify which album can be accessed by a third person. Now, since the second album, which has been requested for access, is selected, the controller 180 can approve access to the second album by a third person. Accordingly, the third person can access the second album A2 displayed on the external electronic device 200.

Meanwhile, by displaying those albums allowing access restrictively as being deactivated, the external electronic device 200 can display albums by separating them into a group of albums allowed for access and those that can be accessed restrictively.

Figure 23A:
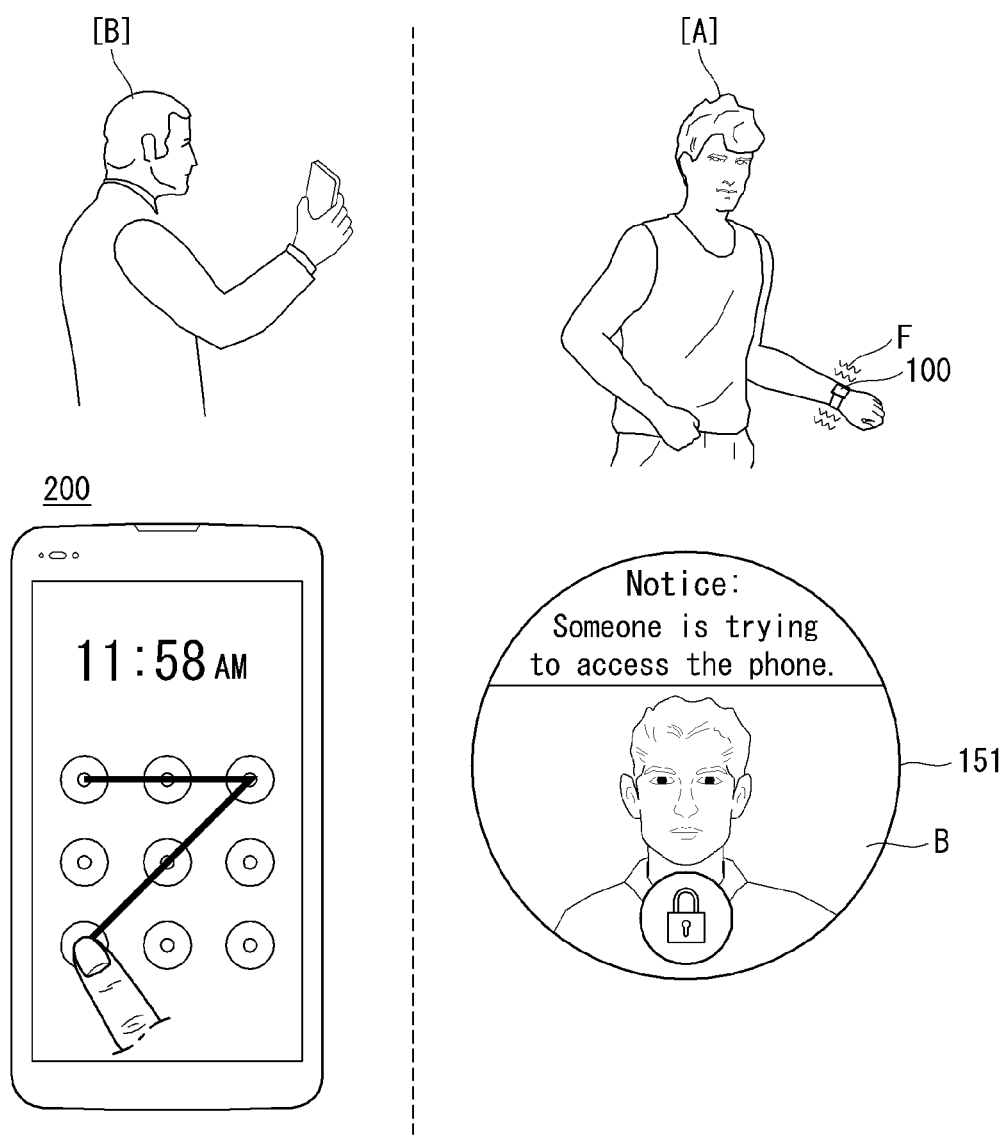
FIGS. 23a to 23c illustrate an example of setting a security level to access a paired external electronic device differently in case a third person or a third external electronic device accesses the paired external electronic device.
Figure 23B:
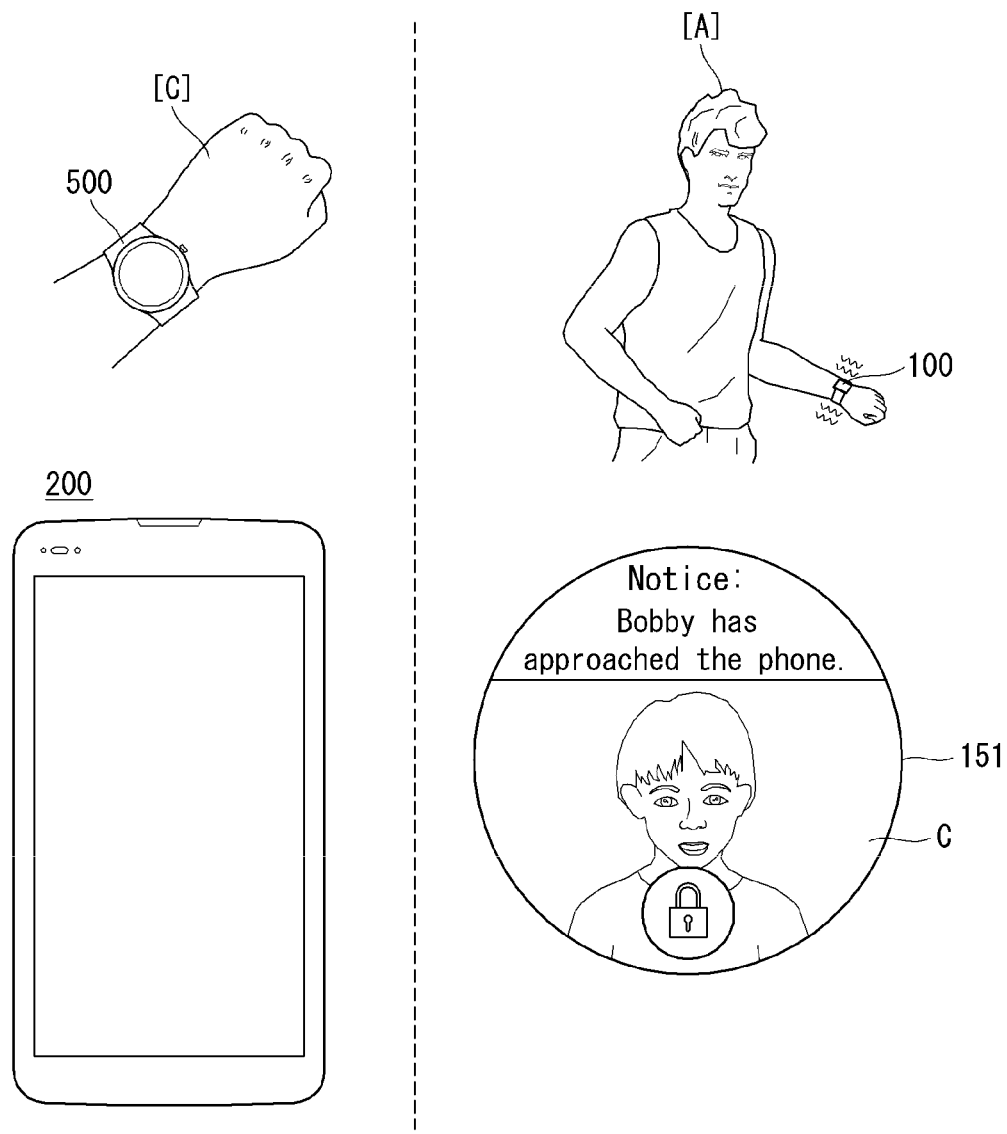
Figure 23C:
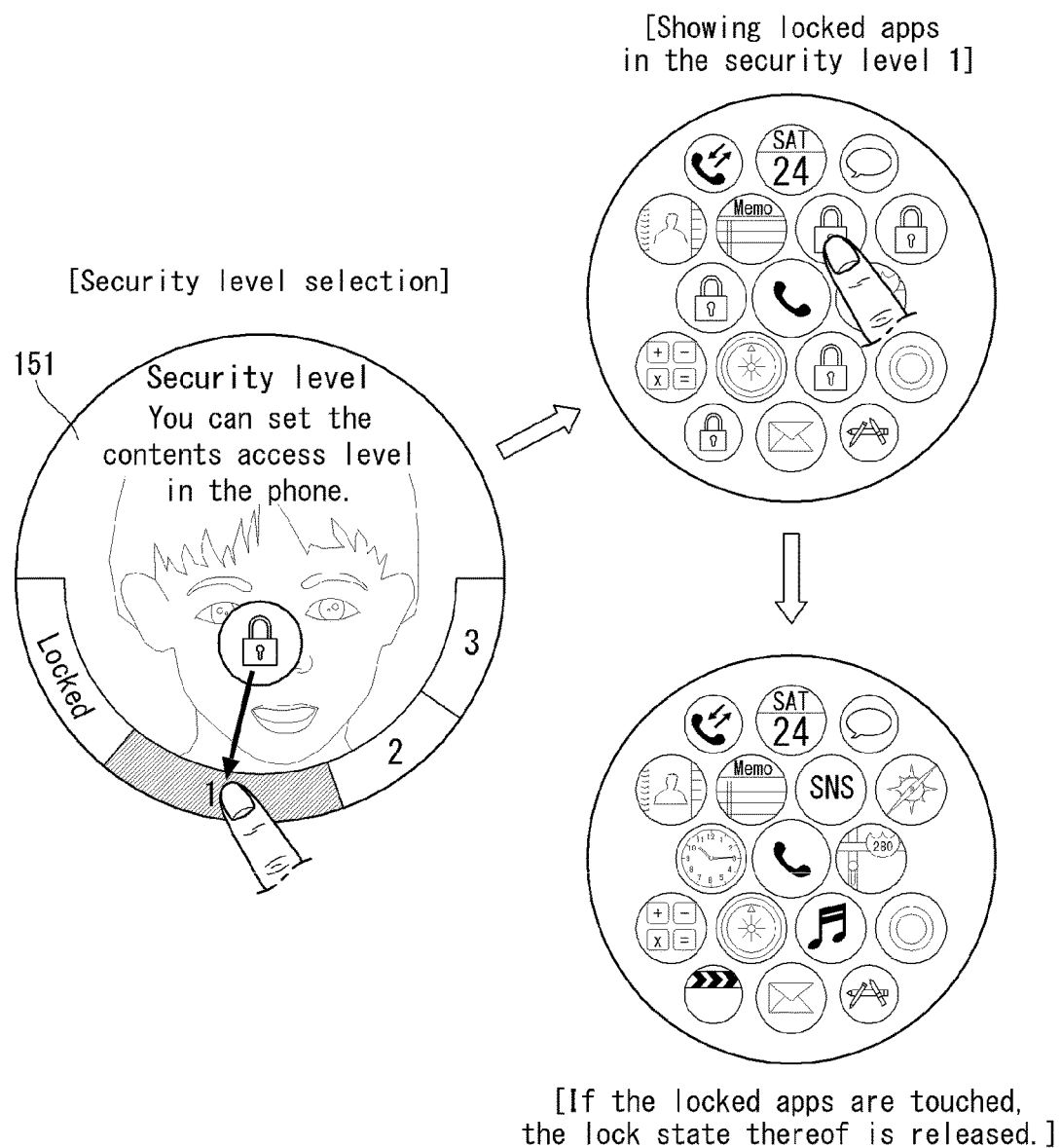

FIGS. 23a to 23c illustrate an example of setting a security level to access a paired external electronic device differently in case a third person or a third external electronic device accesses the paired external electronic device.

In case a third person (B) attempts to access the external electronic device 200 through the screen thereof or a device of a third person (C) accesses the external electronic device 200, the owner (A) of the paired external electronic device 200 can control the access through the watch-type mobile terminal 100.

In case the display 151 of the paired external electronic device 200 is turned on and a predetermined input pattern is applied to the lock screen (see FIG. 23a) or in case a device 500 of the third person (C) accesses the external electronic device 20 (see FIG. 23b), the watch-type mobile terminal 100 can receive a predetermined feedback signal from the external electronic device 200. The feedback signal can be a sound signal or a predetermined vibration pattern (F). In case the feedback signal is received, the controller 180 can request the paired external electronic device 200 to capture an image and check the third person attempting to access the external electronic device 200 by receiving the image captured by the external electronic device 200 and displaying the received image B, C on the display 151.

Next, the controller 180 can display a user interface for setting a security level of the external electronic device 200 on the display 151. The access authority of the external electronic device 200 can be controlled according to the security level set through the user interface.

Figure 24A:
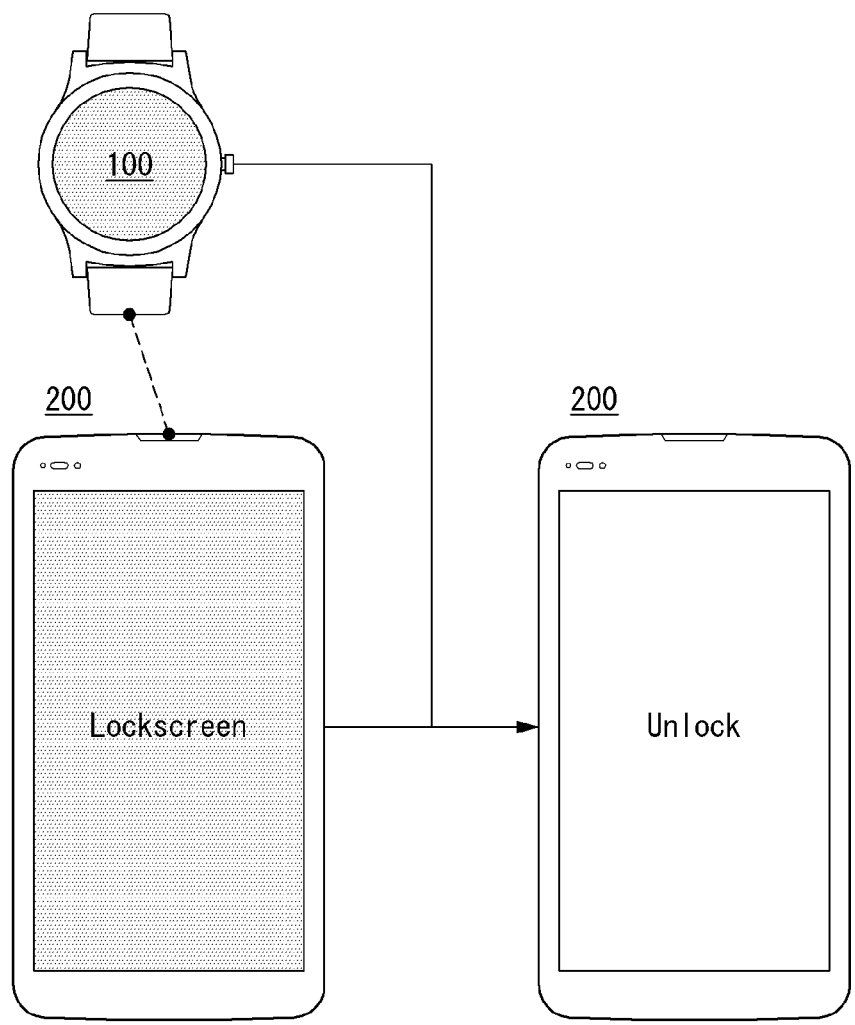
FIGS. 24a, 24b, and 25 illustrate an example of setting a security level to access an external electronic device differently according to the distance between a paired external electronic device and a unregistered device of a third person.
Figure 24B:
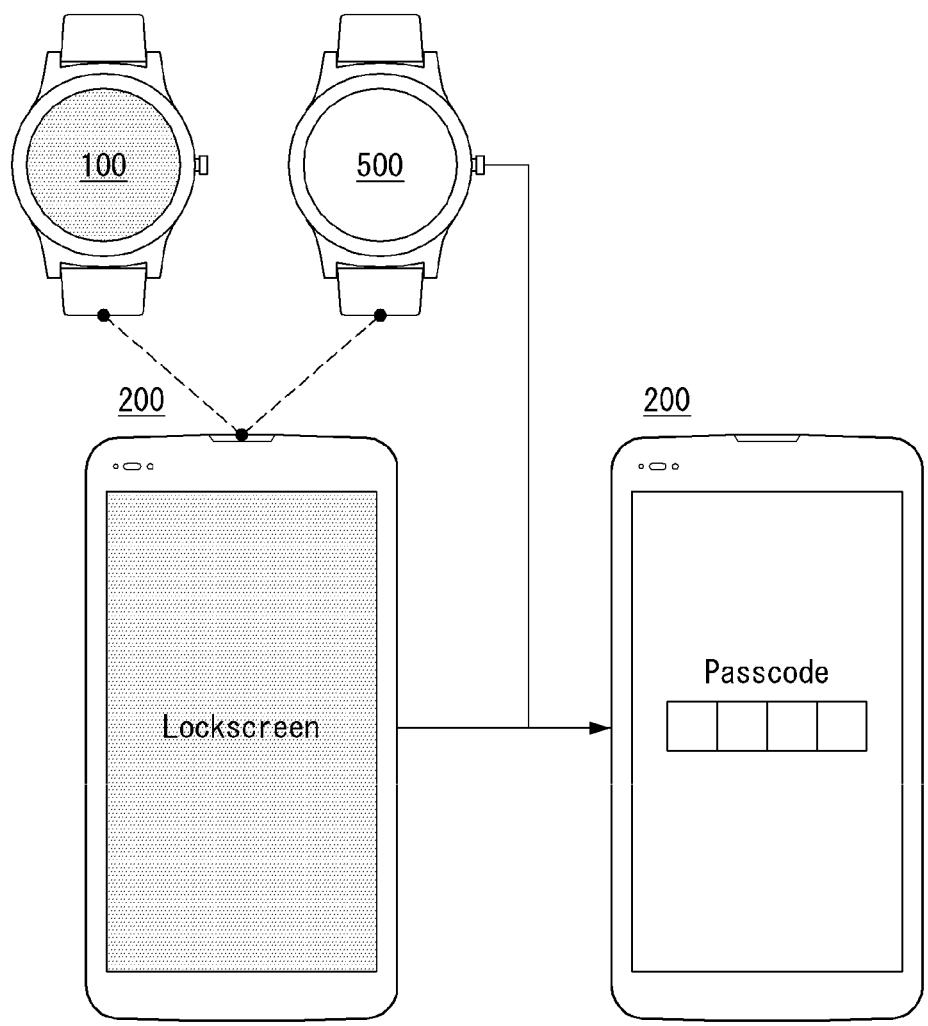
Figure 25:
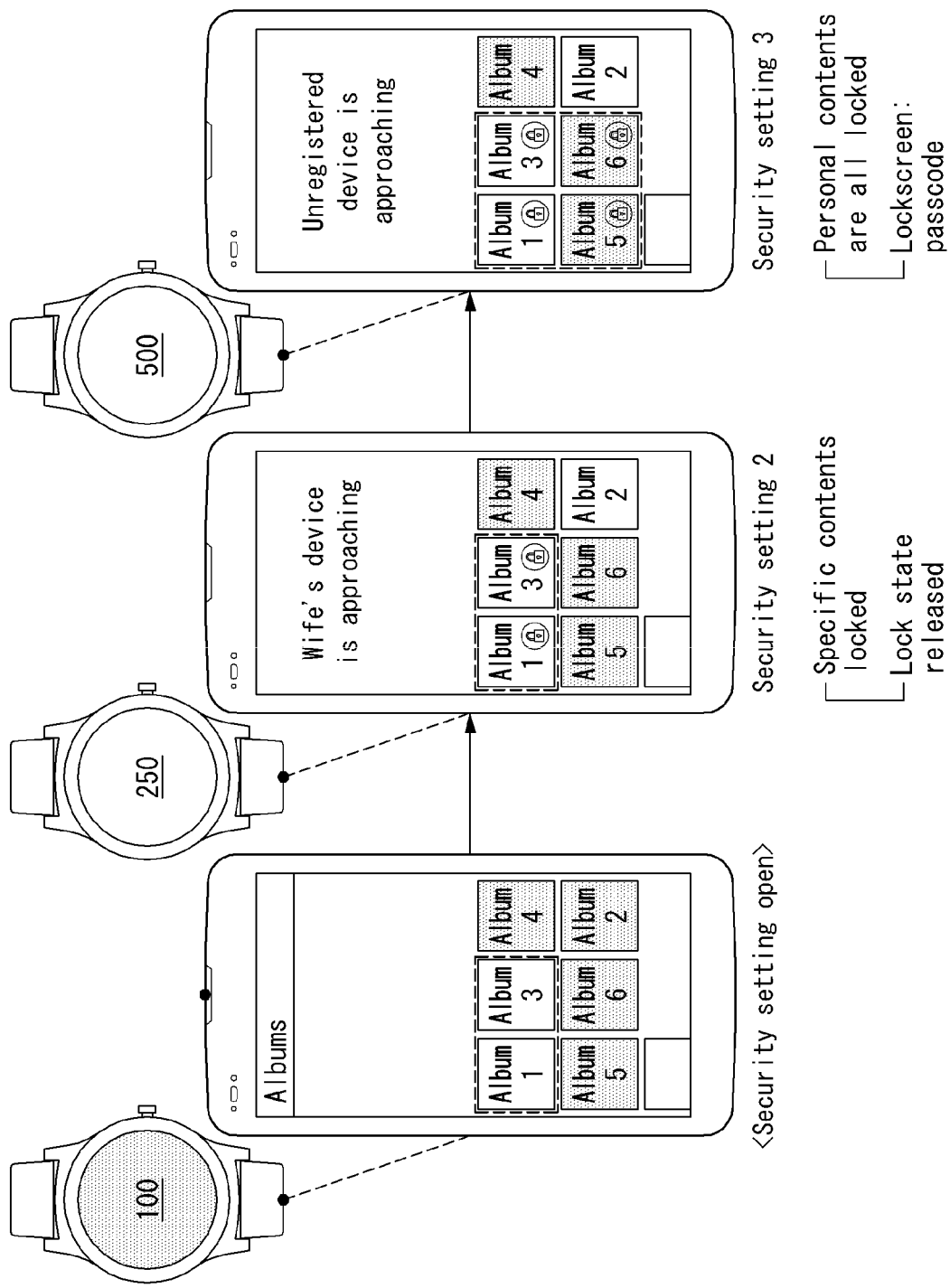

FIGS. 24a to 25 illustrate an example of setting a security level to access an external electronic device differently according to the distance between a paired external electronic device and a unregistered device of a third person.

With reference to FIG. 24a, in case the distance between the paired external electronic device 200 and the watch-type mobile terminal 100 is close and the user is holding the external electronic device 200 in his/her hand while wearing the watch-type mobile terminal 100, the security level of the external electronic device 200 can be reduced. For example, the security level of the external electronic device 200 can be decreased to such a level corresponding to any of the states where no lock state is applied, the lock state is released through a predetermined swiping input (or a lock release pattern input), or the lock state is released through a password.

Differently from the above, with reference to FIG. 24b, in case a unregistered, third electronic device 500 is located in the vicinity of the external electronic device 200, the controller 180 can increase the security level so that the external electronic device 200 is forcibly locked. Or the controller 180 can increase the security level so that the external electronic device 200 cannot be forcibly released from the lock state and the lock state cannot be released even through a predetermined swiping input (or through a lock release pattern input).

With reference to FIG. 25, in case a distance to a paired external electronic device 200 is shortened, the controller 180 can release the security state applied to the contents of the external electronic device 200. Meanwhile, in case a pre-registered, third electronic device 250 accesses the external electronic device 200, the controller 180 can release the lock state of the external electronic device 200, but can still control specific contents which need to be protected for privacy issues to be automatically locked by setting those contents provided through the external electronic device 200 to be locked. Also, in case a unregistered, third electronic device 500 accesses the external electronic device 200, the controller 180 can increase the security level so that the lock screen is converted to receive a password and access is blocked for all of the contents.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A watch-type mobile terminal, comprising:
   a body;
   a band structured to be worn on a wrist of a user;
   a display positioned on a front side of the body;
   a communication unit configured to communicate with a paired external electronic device; and
   a controller configured to:
   cause the display to display a call waiting screen when an incoming call from a calling terminal is received at the external electronic device;
   control an agent to provide a response to the calling terminal for the received call in an automatic answering mode in response to an input received via the call waiting screen;
   terminate the automatic answering mode when the received call is connected to the calling terminal in response to an operation of the external electronic device; and
   transmit to the external electronic device a signal which controls output power of an output unit located in the external electronic device to a maximum when the automatic answering mode is maintained for a first threshold period of time, wherein the output unit includes at least one of a speaker or a vibration unit.

2. The watch-type mobile terminal of claim 1, wherein the agent is an application operating in a voice recognition mode, and wherein the controller is further configured to:

activate a microphone as the watch-type mobile terminal enters the automatic answering mode; and include voice input received via the activated microphone in the response to the calling terminal.

3. The watch-type mobile terminal of claim 2, wherein the call waiting screen comprises a first graphic object to permit connecting the received call and a second graphic object to permit declining the received call; and wherein the controller is further configured to:

cause the display to display a third graphic object corresponding to the automatic answering mode when a touch input is received at the first graphic object for more than a second threshold period of time; and enter the automatic answering mode in response to a touch input selecting the third graphic object.

4. The watch-type mobile terminal of claim 3, wherein the controller is further configured to:

cause the display to display a fourth graphic object when the touch input is received at the first graphic object for more than a second threshold period of time, wherein the third graphic object and the fourth graphic object are displayed simultaneously for a period of time; and connect the received call in a speaker mode, and activate the microphone, in response to a touch input selecting the fourth graphic object.

5. The watch-type mobile terminal of claim 3, wherein the controller is further configured to activate the microphone in response to a touch input selecting the third graphic object for a second threshold period of time.

6. The watch-type mobile terminal of claim 2, wherein the controller is further configured to:

cause the display to display a response from the calling terminal, wherein the response from the calling terminal comprises Speech-To-Text (STT) converted text.

7. The watch-type mobile terminal of claim 6, wherein the controller is further configured to:

set content of the response from the calling terminal as search keywords; and cause the display to display a search result obtained using the search keywords.

8. The watch-type mobile terminal of claim 1, wherein the controller is further configured to:

receive location information of the external electronic device and cause the display to display the location information when the automatic answering mode is maintained for a second threshold period of time.

9. The watch-type mobile terminal of claim 1, wherein the controller is further configured to:

cause predetermined content to be shared with the calling terminal according to the automatic answering mode in response to an input received at the mobile terminal during the automatic answering mode.

10. The watch-type mobile terminal of claim 9, wherein the controller is further configured to:

control the predetermined content to be played at the calling terminal during the call.

11. The watch-type mobile terminal of claim 1, wherein the controller is further configured to:

cause the display to display the call waiting screen when distance between the mobile terminal and the external electronic device is less than a threshold distance; and cause the display to display a message list for declining the incoming call when the distance between the mobile terminal and the external electronic device is greater than a threshold distance.

12. The watch-type mobile terminal of claim 1, wherein the controller is further configured to:

temporarily suspend connection to the call and cause the display to display a graphic object on the call waiting screen upon detection of connection to the received call being attempted by operation of the external electronic device; and control the external electronic device to resume connection to the call in response to selection of the graphic object.

13. The watch-type mobile terminal of claim 12, wherein the controller is further configured to:

receive from the external electronic device an image captured through a camera of the external electronic device; and cause the display to display the received image on the call waiting screen.

14. A method for controlling a watch-type mobile terminal having a display, the method comprising:

detecting an external electronic device paired with the watch-type mobile terminal;

displaying, on the display, a call waiting screen when an incoming call from a calling terminal is received at the external electronic device;

controlling an agent to provide a response to the calling terminal for the received call in an automatic answering mode in response to an input received via the call waiting screen;

terminating the automatic answering mode when the received call is connected to the calling terminal in response to an operation of the external electronic device; and transmitting to the external electronic device a signal which controls output power of an output unit located in the external electronic device to a maximum when the automatic answering mode is maintained for a first threshold period of time, wherein the output unit includes at least one of a speaker or a vibration unit.

15. The method of claim 14, wherein the call waiting screen comprises a first graphic object to permit connecting the received call and a second graphic object to permit declining the received call; and wherein the method further comprises:

displaying, on the display, a third graphic object corresponding to the automatic answering mode when a touch input is received at the first graphic object for more than a threshold period of time; and entering the automatic answering mode in response to a touch input selecting the third graphic object.

* * * * *